(12) United States Patent
Dylewski, II et al.

(10) Patent No.: US 12,397,625 B2
(45) Date of Patent: *Aug. 26, 2025

(54) TONNEAU COVER

(71) Applicant: Truck Accessories Group, LLC, Elkhart, IN (US)

(72) Inventors: Eugene A. Dylewski, II, Granger, IN (US); Adrian Cook, Raymond, WA (US); Justin J. McGraw, Rochester, WA (US); Christopher David Mattison, South Bend, IN (US); Ernest M. McDonald, II, Granger, IN (US)

(73) Assignee: Leer Group, Elkhart, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/061,116

(22) Filed: Dec. 2, 2022

(65) Prior Publication Data

US 2023/0107288 A1    Apr. 6, 2023

Related U.S. Application Data

(63) Continuation of application No. 16/933,069, filed on Jul. 20, 2020, now abandoned, which is a (Continued)

(51) Int. Cl.
*B60J 7/19* (2006.01)
*B60J 7/14* (2006.01)
*B60P 7/02* (2006.01)

(52) U.S. Cl.
CPC .............. *B60J 7/198* (2013.01); *B60J 7/141* (2013.01); *B60P 7/02* (2013.01)

(58) Field of Classification Search
CPC ... B60J 7/041; B60J 7/141; B60J 7/198; B60J 7/1607; B60P 7/02; B60P 7/04
(Continued)

(56) References Cited

U.S. PATENT DOCUMENTS 6,929,303 B1 * 8/2005 Sharples ............... B60P 3/0255
296/100.1
10,046,632 B2 * 8/2018 Dylewski, II ............ B60J 7/141
(Continued)

FOREIGN PATENT DOCUMENTS

WO    2018/018962 A1    2/2018

OTHER PUBLICATIONS

IStatement of Admitted Prior Art executed by Gene Dylewski at Leer Group on Jan. 22, 2024.
(Continued)

*Primary Examiner* — Gregory A Blankenship
(74) *Attorney, Agent, or Firm* — Barnes & Thornburg LLP

(57) ABSTRACT

A pickup truck having a tonneau cover is provided. The tonneau cover includes a first panel section pivotable with respect to the opposing first and second upward-extending side walls. A first latching assembly is attached to the first panel section and is configured to selectively secure and release the first panel section with respect to the first and second side walls of the pickup truck. The first latching assembly includes first and second pinch latch assemblies. The first pinch latch assembly is located adjacent the first upward-extending side wall of the pickup truck and the second pinch latch assembly is located adjacent the second upward-extending side wall of the pickup truck.

14 Claims, 34 Drawing Sheets

Related U.S. Application Data continuation of application No. 16/101,900, filed on Aug. 13, 2018, now Pat. No. 10,717,350, which is a continuation of application No. 15/342,407, filed on Nov. 3, 2016, now Pat. No. 10,046,632.

(60) Provisional application No. 62/250,649, filed on Nov. 4, 2015.

(58) Field of Classification Search
USPC .................................. 296/100.01–100.18
See application file for complete search history.

(56) References Cited

U.S. PATENT DOCUMENTS

| | | | | |
|---|---|---|---|---|
| 10,232,691 | B1* | 3/2019 | Weng | B60J 7/198 |
| 10,717,350 | B2* | 7/2020 | Dylewski, II | B60P 7/02 |
| 11,752,917 | B2* | 9/2023 | Barnhart | E04H 15/08 |
| | | | | 296/164 |
| 12,036,853 | B2* | 7/2024 | Dylewski, II | B60J 7/1607 |
| 2003/0047958 | A1* | 3/2003 | Yarbrough | B60J 7/1621 |
| | | | | 296/100.06 |
| 2011/0260493 | A1* | 10/2011 | Xu | B60J 7/198 |
| | | | | 296/100.07 |
| 2016/0075220 | A1* | 3/2016 | Williamson | B60J 7/185 |
| | | | | 296/98 |
| 2016/0236552 | A1* | 8/2016 | Hannan | B60J 7/068 |
| 2017/0240033 | A1* | 8/2017 | Dylewski, II | B60J 7/141 |
| 2017/0259655 | A1* | 9/2017 | Dylewski, II | B60J 7/198 |
| 2017/0267108 | A1* | 9/2017 | Jalla | B60L 7/16 |
| 2018/0186221 | A1* | 7/2018 | Capiak | B60Q 1/535 |
| 2019/0126734 | A1* | 5/2019 | Dylewski, II | B60J 7/141 |
| 2019/0160925 | A1* | 5/2019 | Salter | C09K 11/02 |
| 2020/0130487 | A1* | 4/2020 | Dylewski, II | B60J 7/141 |
| 2021/0291633 | A1* | 9/2021 | Gu | B60J 7/141 |
| 2021/0354537 | A1* | 11/2021 | Kneifl | B62D 33/03 |
| 2022/0065020 | A1* | 3/2022 | Carter | G08C 17/02 |
| 2022/0176786 | A1* | 6/2022 | Dylewski, II | B60J 7/198 |
| 2022/0242208 | A1* | 8/2022 | Klein | B60J 7/062 |
| 2022/0289009 | A1* | 9/2022 | Fisher | B60J 1/10 |
| 2023/0018196 | A1* | 1/2023 | Hu | B60J 7/14 |
| 2023/0032014 | A1* | 2/2023 | Mohr, IV | B60J 7/141 |
| 2023/0226895 | A1* | 7/2023 | Becker | B60J 7/198 |
| | | | | 296/100.02 |
| 2023/0264548 | A1* | 8/2023 | Dylewski, II | B60J 7/141 |
| | | | | 296/100.12 |

OTHER PUBLICATIONS

Rugged Liner; Truck Hero; Premium Hard Folding Cover LED Light Battery Removal; www.ruggedliner.com; undated.

Rugged Liner; a Real Truck Brand;Rugged Cover Tonneau Covers;HC3 Premium Hard Folding Truck Bed Cover; printed Oct. 20, 2023; https://protect-us.mimecast.com/s/rTDgC1wkBYUMKEyquL7Rcv?domain=ruggedliner.com.

Rugged Liner; a Real Truck Brand; Tail Latch Pocket Cover With LED & Screw for Premium Hard Folding Covers; printed Oct. 20, 2023; https://ruggedliner.com/tail-latch-pocket-cover-with-led-and-screw-for-premium-hard-folding-covers.

European Search Report 24166034.9-1009 / 4371860; Leer Group; Dated Jun. 4, 2024.

\* cited by examiner

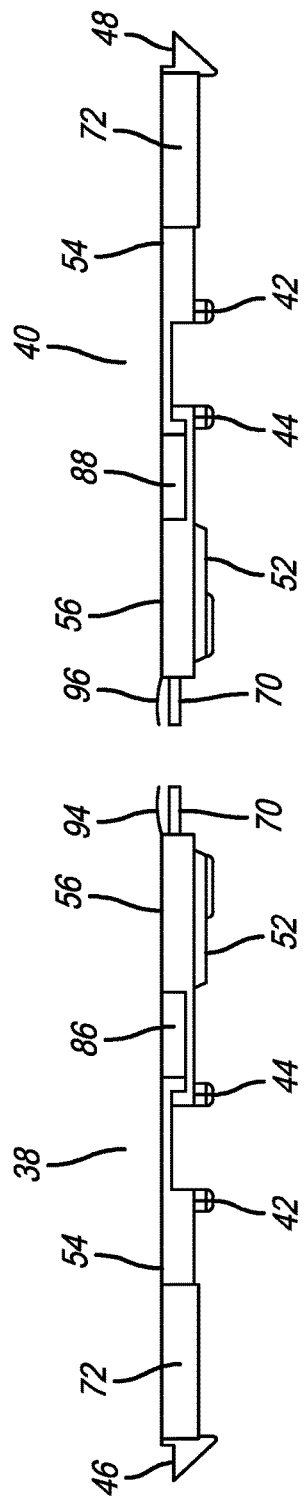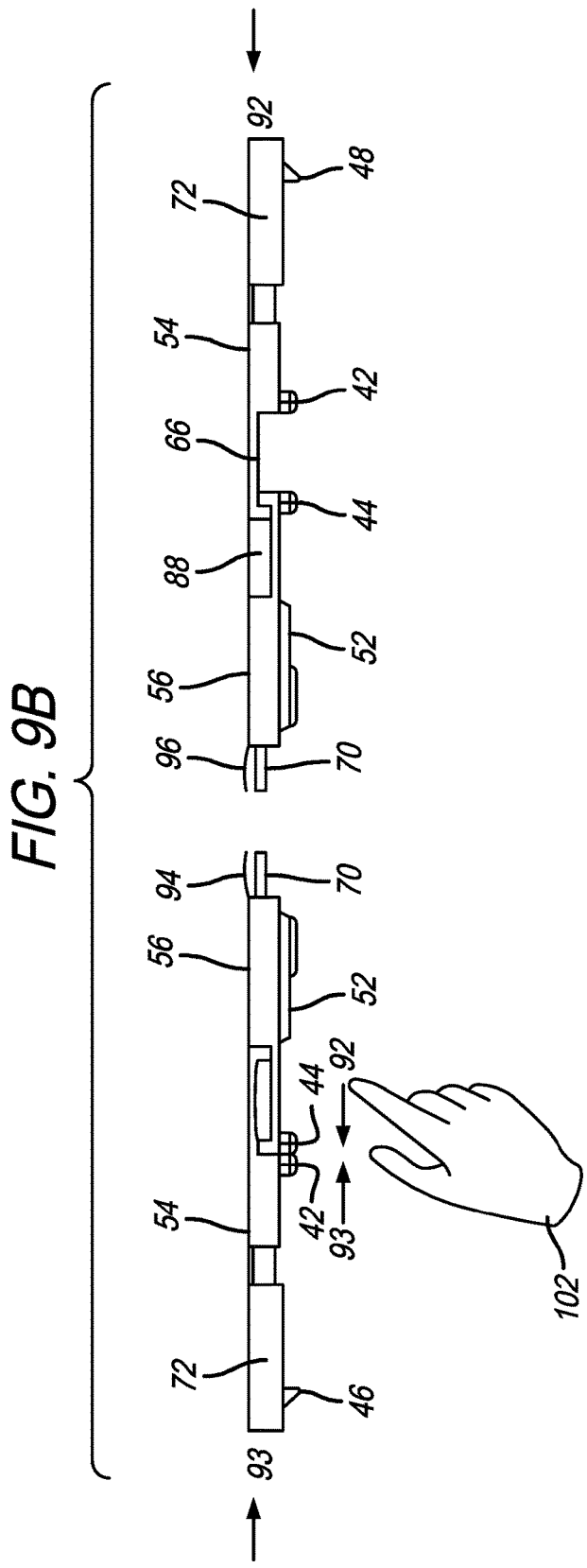
FIG. 9A
FIG. 9B

TONNEAU COVER

RELATED APPLICATIONS

The present Application is a Continuation of application Ser. No. 16/933,069, filed on Jul. 20, 2020, entitled "Tonneau Cover," which is a Continuation of application Ser. No. 16/101,900, filed on Aug. 13, 2018, entitled "Tonneau Cover," now U.S. Pat. No. 10,717,350, which is a continuation of application Ser. No. 15/342,407, filed on Nov. 3, 2016, entitled "Tonneau Cover," now U.S. Pat. No. 10,046,632, which claims priority to U.S. Provisional Patent Application, Ser. No. 62/250,649, filed on Nov. 4, 2015, entitled "Tonneau Cover." The subject matter disclosed in those applications are hereby expressly incorporated into the present application by reference.

TECHNICAL FIELD AND SUMMARY

The present disclosure relates to trucks such as pickup trucks, and truck beds used on pickup trucks and like vehicles, and, in particular, a truck bed cover also known as a tonneau cover that includes new features and is used on such truck beds.

Tonneau covers are truck bed covers that provide a covering for a truck bed when used in combination with the truck's side walls and tailgate. Covering the bed of a pickup truck helps create a secure compartment where items may be stored out of view when the tailgate is up. Embodiments of a tonneau cover, according to the present disclosure, may provide any one or more of the following features: latch and pinch handle; vertical support assembly; a buckle system; a hinge seal spacer; seal rods; and side rails.

An illustrative embodiment of the present disclosure provides a pickup truck that includes a bed section rear of a cab section. The bed section is bounded on each side by opposing first and second upward-extending side walls, respectively. The pickup truck includes a tonneau cover which comprises a base panel, a plurality of panel sections, a first latching assembly, and a second latching assembly. The base panel attaches to the opposing first and second upward-extending side walls and extends over the bed section of the pickup truck. The plurality of panel sections are each selectively movable to allow access to the bed section of the pickup truck. A first panel section of the plurality of panel sections is pivotally attachable to the base panel. The first latching assembly is attached to the first panel section of the plurality of panel sections, and is configured to selectively secure and release the first panel section of the plurality of panel sections with respect to the first and second side walls of the pickup truck. The second panel section of the plurality of panel sections is pivotally attached to the first panel section. The second latching assembly is attached to the second panel section of the plurality of panel sections, and is configured to selectively secure and release the second panel section of the plurality of panel sections with respect to the first and second side walls of the pickup truck. Each of the first and second latching assemblies include first and second pinch latch assemblies. The first pinch latch assembly of the first and second latching assemblies is located adjacent the first upward-extending side wall of the pickup truck. The second pinch latch assembly of the first and second latching assemblies is located adjacent the second upward-extending side wall of the pickup truck. Each of the first and second pinch latch assemblies comprise: a latch handle portion and an inner pinch handle portion; wherein the latch handle portion includes a latch, a latch handle, at least one spring pocket located between the latch and the latch handle, and at least one guide tab extending away from the latch; and at least one spring that fits into the at least one spring pocket of the latch handle portion. The inner pinch handle portion includes a handle and at least one slot configured to receive at least a portion of the at least one guide tab of the latch handle portion. The handle of the latch handle portion is selectively separated from the handle of the inner pinch handle portion. Such separation is at least in part defined by interaction between the portion of the at least one guide tab of the latch handle portion located in the at least one slot of the inner pinch handle portion. The at least one spring is located in the at least one spring pocket of latch handle portion biases the latch of the latch handle portion toward a latched condition such that when a force is applied to draw the handle of the latch handle portion and the handle of the inner pinch handle portion toward each other. The at least one spring creates a resistance force against the force but is overcome by the force such that movement of the handle of the latch handle portion and the handle of the inner pinch handle portion toward each other moves the latch of the latch handle portion to an unlatched condition. A longitudinally extending connector is attached to the inner pinch handle portion of the first pinch latch assembly and the inner pinch handle portion of the second pinch latch assembly such that when the inner pinch handle portion of the first pinch latch assembly is moved by the force applied to the handle of the latch handle portion and the handle of the inner pinch handle portion toward each other, the inner pinch handle portion of the second pinch latch assembly is caused to move which moves the latch of the latch handle portion of the second pinch latch assembly to the unlatched condition. The at least one spring of the latch handle portion of both of the first and second pinch latch assemblies are configured to move the handle of the latch handle portion and the handle of the inner pinch handle portion so that the latch of the latch handle portion of the both of the first and second pinch latch assemblies are moved back to the latched condition when the force applied to the handle of the latch handle portion and the handle of the inner pinch handle portion is ceased.

In the above another embodiment, the tonneau cover may further comprise: the longitudinally-extending connector being selected from the group consisting of a panel, a bar, and a rod; the plurality of panel sections each includes a frame, a portion of which is located adjacent the first and second latching assemblies, and wherein the longitudinally-extending connector moves the inner pinch handle portion of the first pinch handle assembly when the inner pinch handle portion of the second pinch handle assembly is manually moved; a latch guide located adjacent the latch handle portion and is stationary with retrospect to the latch handle portion, and which engages the at least one spring to produce the resistance force against the force; when the force applied to the handle of the latch portion is ceased, the latch handle portion of the first and second pinch latch assemblies both move to the latched condition; the latch guide includes an opening to accommodate movement of the latch of the latch handle portion with respect to the latch guide; the inner pinch handle portion includes a cavity illustratively configured to hold a structure selected from the group consisting of a light and a cover; the first and second latching assemblies are positioned substantially flush with their respective frames of the first and second panel sections; a first rail extending longitudinally along a longitudinal extent of the first upwardly-extending side wall, wherein the first rail includes a clip for each latch of the latch handle portion of the first pinch latch assembly, wherein the latch is configured to selectively engage the clip when the latch handle portion is located in the latched condition.

Another illustrative embodiment of the pickup truck includes a tonneau cover which comprises: a first panel section pivotable with respect to the opposing first and second upward-extending side walls; a first latching assembly that attaches to the first panel section and is configured to selectively secure and release the first panel section with respect to the first and second side walls of the pickup truck; the first latching assembly includes first and second pinch latch assemblies; the first pinch latch assembly is located adjacent the first upward-extending side wall of the pickup truck and the second pinch latch assembly is located adjacent the second upward-extending side wall of the pickup truck; the first pinch latch assembly is located on the first panel section located spaced apart and opposite the second pinch latch assembly; each of the first and second pinch latch assemblies comprise: a latch handle portion and an inner handle portion; the latch handle portion includes a latch, a pocket, and a guide; the inner handle portion includes a slot configured to receive at least a portion of the guide of the latch handle portion; a spring that fits into the pocket of the latch handle portion; and a longitudinally extending connector attached to both the first pinch latch assembly and the second pinch latch assembly; wherein the spring biases the latch of the latch handle portion toward a latched condition such that when a force is applied to the latch handle portion or the inner handle portion, the spring creates a resistance force against the force but is overcome by the force such that movement of the latch handle portion moves the latch of the latch handle portion to an unlatched condition; wherein both the first pinch latch assembly and the second pinch latch assembly are moved by the force applied to the latch handle portion or the inner pinch handle portion which causes the inner handle portion of the second pinch latch assembly to move the latch of the latch handle portion of the second pinch latch assembly to the unlatched condition; and wherein the spring is configured to move the latch handle portion and the inner handle portion so that the latch of the latch handle portion is moved back to the latched condition when the force applied to the latch handle portion or the inner handle portion is ceased.

In the above another embodiment, the tonneau cover may further comprise: the latch handle portion further includes a latch handle and at least one spring pocket located between the latch and the latch handle, wherein the guide extends away from the latch, and a spring that fits into the pocket of the latch handle portion; and the handle of the latch handle portion is selectively separated from the handle of the inner handle portion, wherein such separation is at least in part defined by interaction between the portion of the guide of the latch handle portion located in the slot of the inner handle portion.

Another illustrative embodiment of the pickup truck includes a tonneau cover which comprises: a first panel section pivotable with respect to the opposing first and second upward-extending side walls; a first latching assembly attached to the first panel section and is configured to selectively secure and release the first panel section with respect to the first and second side walls of the pickup truck; the first latching assembly includes first and second pinch latch assemblies; the first pinch latch assembly is located adjacent the first upward-extending side wall of the pickup truck and the second pinch latch assembly is located adjacent the second upward-extending side wall of the pickup truck; each of the first and second pinch latch assemblies comprise: a latch handle portion and an inner pinch handle portion; and when a force is applied to the first pinch latch assembly it moves to an unlatched condition.

In the above another embodiment, the tonneau cover may further comprise: a second panel section of the plurality of panel sections which is pivotally attached to the first panel section; a second latching assembly attached to the second panel section of the plurality of panel sections and configured to selectively secure and release the second panel section of the plurality of panel sections with respect to the first and second side walls of the pickup truck; and wherein each of the first and second latching assemblies include first and second pinch latch assemblies; the latch handle portion includes a latch, a latch handle, at least one spring pocket located between the latch and the latch handle, at least one guide extending away from the latch; and at least one spring that fits into the at least one spring pocket of the latch handle portion; the inner pinch handle portion includes a handle and at least one slot configured to receive at least a portion of the at least one guide tab of the latch handle portion; the handle of the latch handle portion is selectively separated from the handle of the inner pinch handle portion, wherein such separation is at least in part defined by interaction between the portion of the at least one guide tab of the latch handle portion located in the at least one slot of the inner pinch handle portion; the at least one spring located in the at least one spring pocket of latch handle portion biases the latch of the latch handle portion toward a latched condition such that when a force is applied to draw the handle of the latch handle portion and the handle of the inner pinch handle portion toward each other, the at least one spring creates a resistance force against the force but is overcome by the force such that movement of the handle of the latch handle portion and the handle of the inner pinch handle portion toward each other moves the latch of the latch handle portion to an unlatched condition; a longitudinally extending connector attached to the inner pinch handle portion of the first pinch latch assembly and the inner pinch handle portion of the second pinch latch assembly such that when the inner pinch handle portion of the first pinch latch assembly is moved by the force applied to the handle of the latch handle portion and the handle of the inner pinch handle portion toward each other, the inner pinch handle portion of the second pinch latch assembly is caused to move which moves the latch of the latch handle portion of the second pinch latch assembly to the unlatched condition; and the at least one spring of the latch handle portion of both of the first and second pinch latch assemblies are configured to move the handle of the latch handle portion and the handle of the inner pinch handle portion so that the latch of the latch handle portion of the both of the first and second pinch latch assemblies are moved back to the latched condition when the force applied to the handle of the latch handle portion and the handle of the inner pinch handle portion is ceased.

Additional features and advantages of the tonneau cover will become apparent to those skilled in the art upon consideration of the following detailed descriptions exemplifying the best mode of carrying out the tonneau cover as presently perceived.

DESCRIPTION OF THE DRAWINGS

The present disclosure will be described hereafter with reference to the attached drawings which are given as non-limiting examples only, in which:

FIGS. 9A and 9B demonstrate operation of the latch and pinch handles;

DETAILED DESCRIPTION OF THE DRAWINGS

Figure 1:
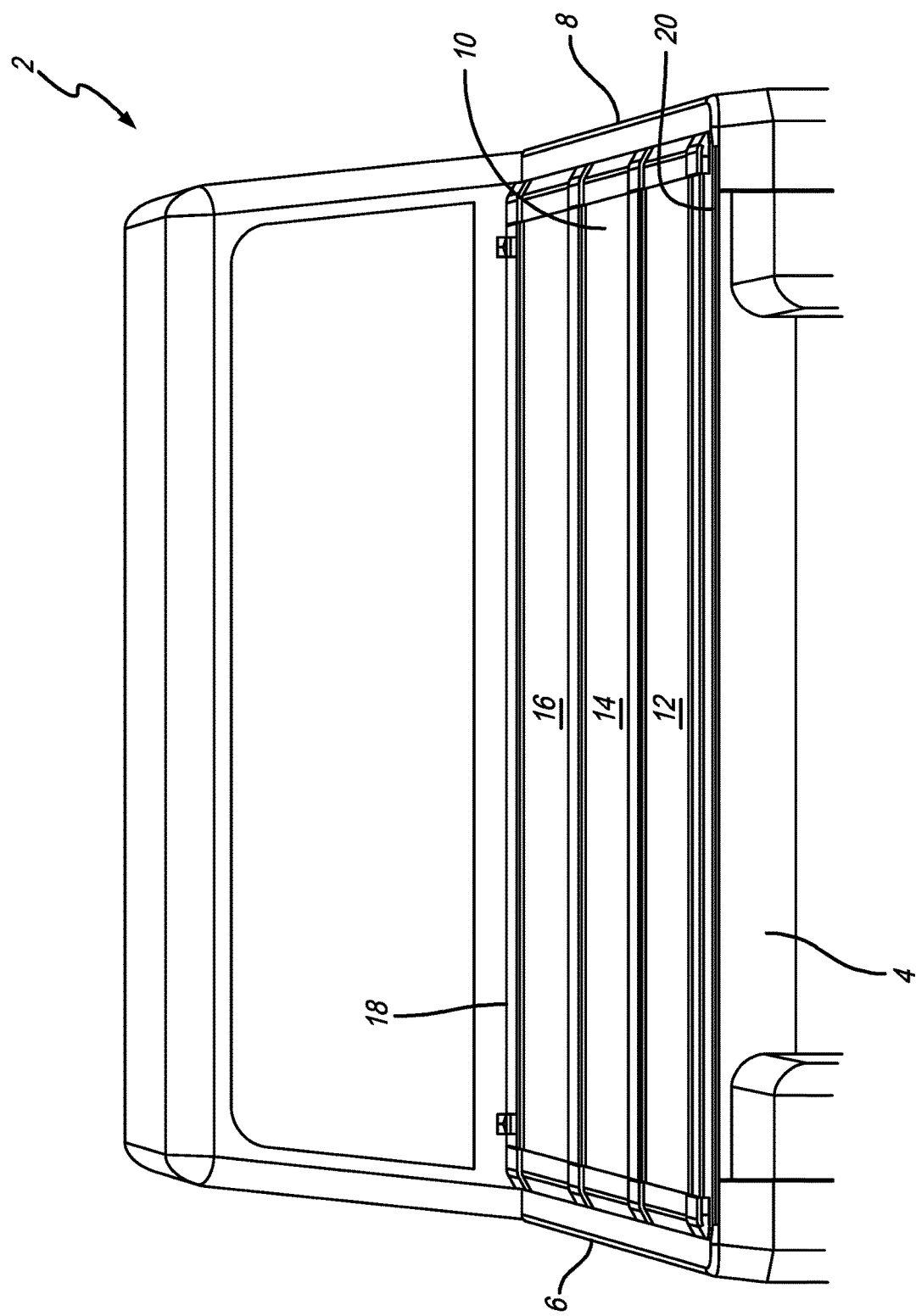
FIG. 1 is a rear perspective view of a truck with accompanying truck bed having an illustrative embodiment of a tonneau cover attached thereto.

The figures and descriptions provided herein may have been simplified to illustrate aspects that are relevant for a clear understanding of the herein described apparatuses, systems, and methods, while eliminating, for the purpose of clarity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and because they do not facilitate a better understanding of the present disclosure, for the sake of brevity a discussion of such elements and operations may not be provided herein. However, the present disclosure is deemed to nevertheless include all such elements, variations, and modifications to the described aspects that would be known to those of ordinary skill in the art.

Embodiments are provided throughout so that this disclosure is sufficiently thorough and fully conveys the scope of the disclosed embodiments to those who are skilled in the art. Numerous specific details are set forth, such as examples of specific components, devices, and methods, to provide a thorough understanding of embodiments of the present disclosure. Nevertheless, it will be apparent to those skilled in the art that certain specific disclosed details need not be employed, and that embodiments may be embodied in different forms. As such, the embodiments should not be construed to limit the scope of the disclosure. As referenced above, in some embodiments, well-known processes, well-known device structures, and well-known technologies may not be described in detail.

The terminology used herein is for the purpose of describing particular embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their respective performance in the particular order discussed or illustrated, unless specifically identified as a preferred or required order of performance. It is also to be understood that additional or alternative steps may be employed, in place of or in conjunction with the disclosed aspects.

When an element or layer is referred to as being "on", "upon", "connected to" or "coupled to" another element or layer, it may be directly on, upon, connected or coupled to the other element or layer, or intervening elements or layers may be present, unless clearly indicated otherwise. In contrast, when an element or layer is referred to as being "directly on," "directly upon", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). Further, as used herein the term "and/or" includes any and all combinations of one or more of the associated listed items.

Yet further, although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the embodiments.

A perspective rear view of a truck 2 with accompanying truck bed 4 comprising side walls 6 and 8 is shown in FIG. 1. Also, spanning side walls 6 and 8 to cover same is a truck bed or tonneau cover 10. Illustratively, cover 10 is made up of a plurality of panel sections 12, 14, and 16, that are movable to allow access to bed 4 underneath. A base panel 18 is illustratively attached over bed 4 but is not movable to reveal bed 4 below. Instead, base panel 18 is employed to allow the other panel sections 12, 14, and 16 to pivot with respect to it as well as assist panel sections 12, 14, and 16 in being stored in an open/upright position with respect to bed 4. Illustrative features of cover 10 include, but are not limited to, a latching assembly 20, a vertical support gusset assembly 22 (see FIG. 19), a securement system 24 (see FIG. 31), a hinge assembly 26 with a hinge seal spacer 234 and seal rods 252 (see FIGS. 25 and 26), and improved side rails 109, 110 (see FIG. 28).

Figure 2:
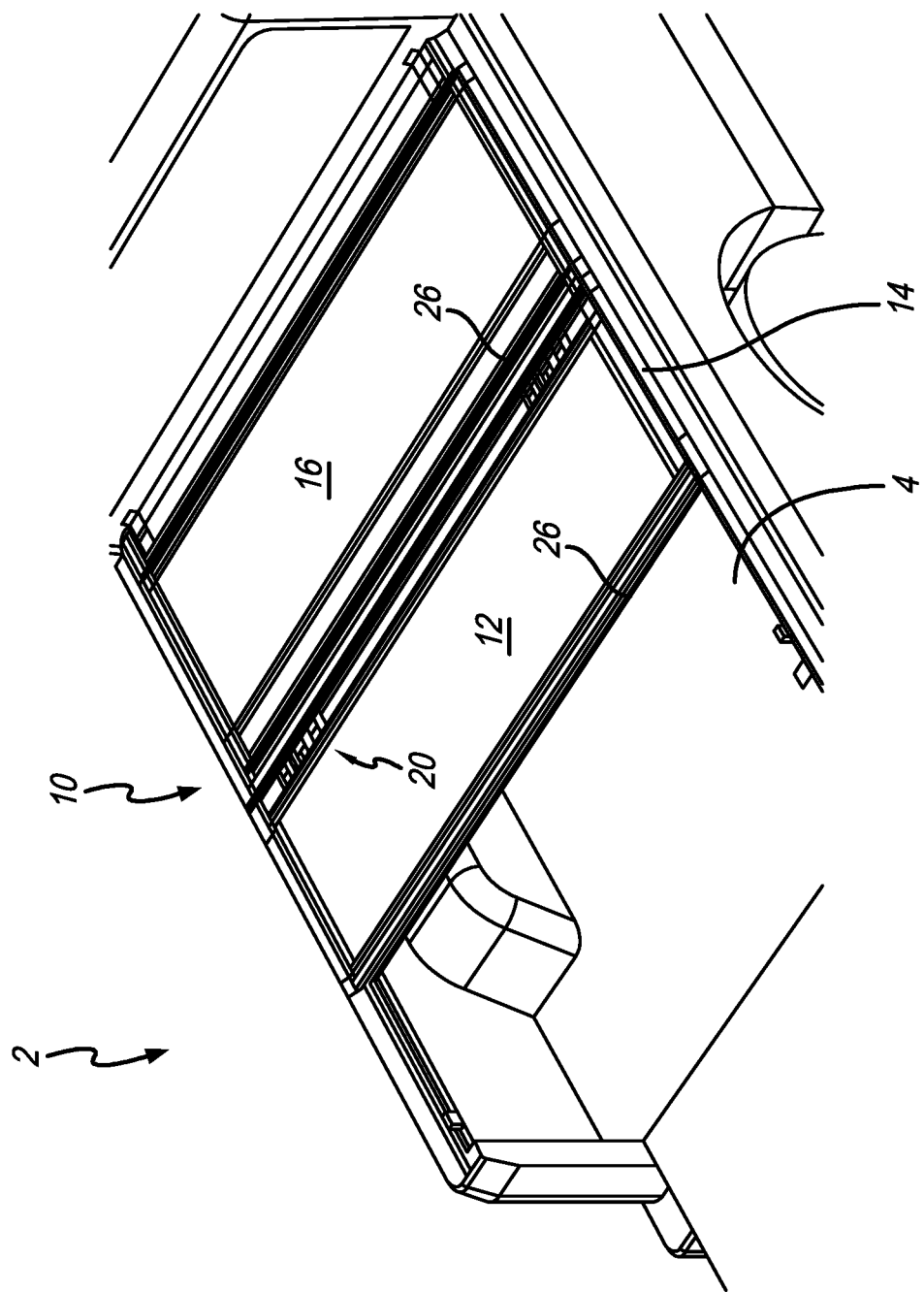
FIG. 2 is another rear perspective view of the truck bed with the tonneau thereon with one of its panels in a folded-back position.
Figure 3:
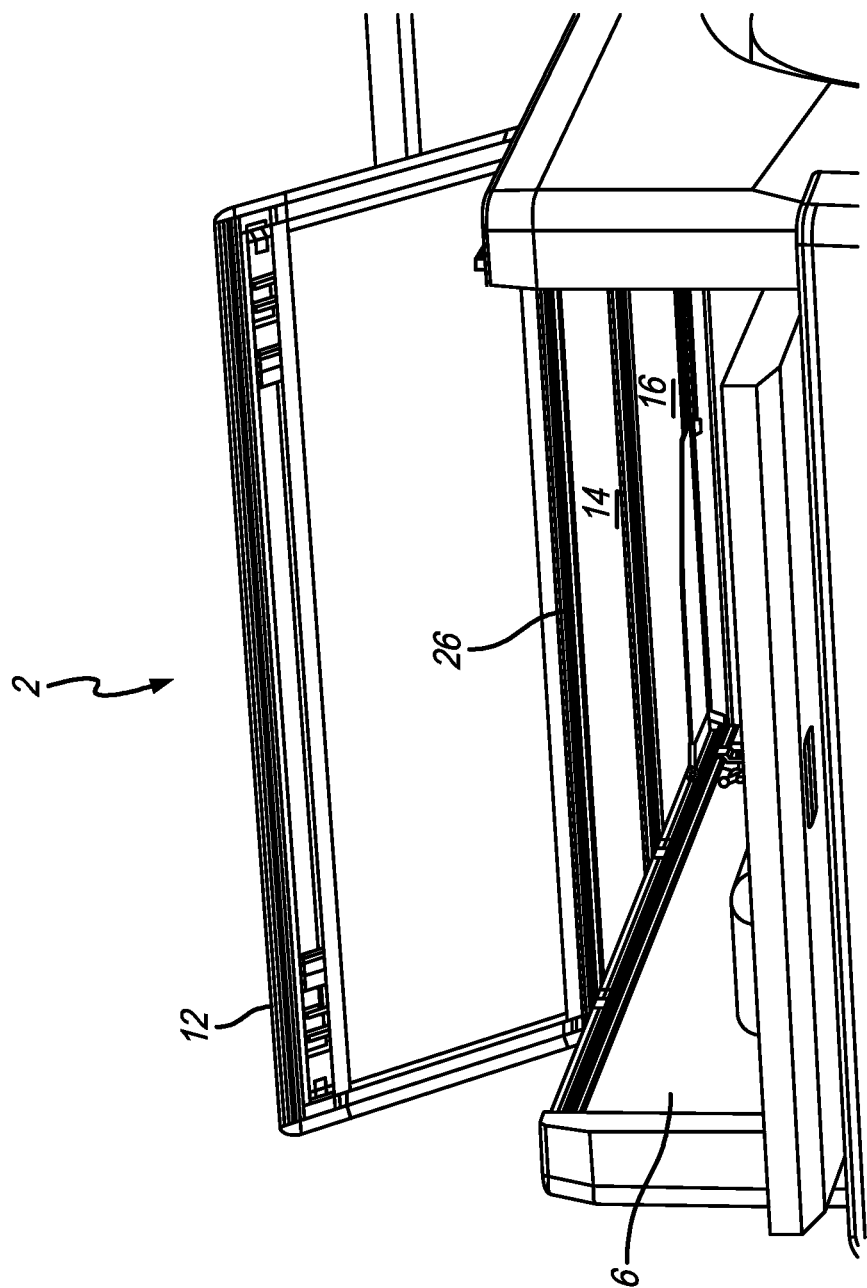
FIG. 3 is another rear perspective view of the first and second panels in their folded back condition.

Another perspective view of truck 2 showing cover 10 over bed 4, but with panel section 12 folded back over panel section 14 is shown in FIG. 2. Panel section 12 pivots about hinge assembly 26. Also shown in this view is latching assembly 20, configured to secure and release panel section 12 from side walls 6 and 8 (see also FIG. 1).

Another perspective view of truck 2 is shown with panel sections 12 and 14, each with a latching assembly 20, and shown being raised to further uncover bed 4. This view demonstrates how pivoting about hinge assembly 26 allows the continued folding up of the cover panels to open up truck bed 4.

Figure 4:
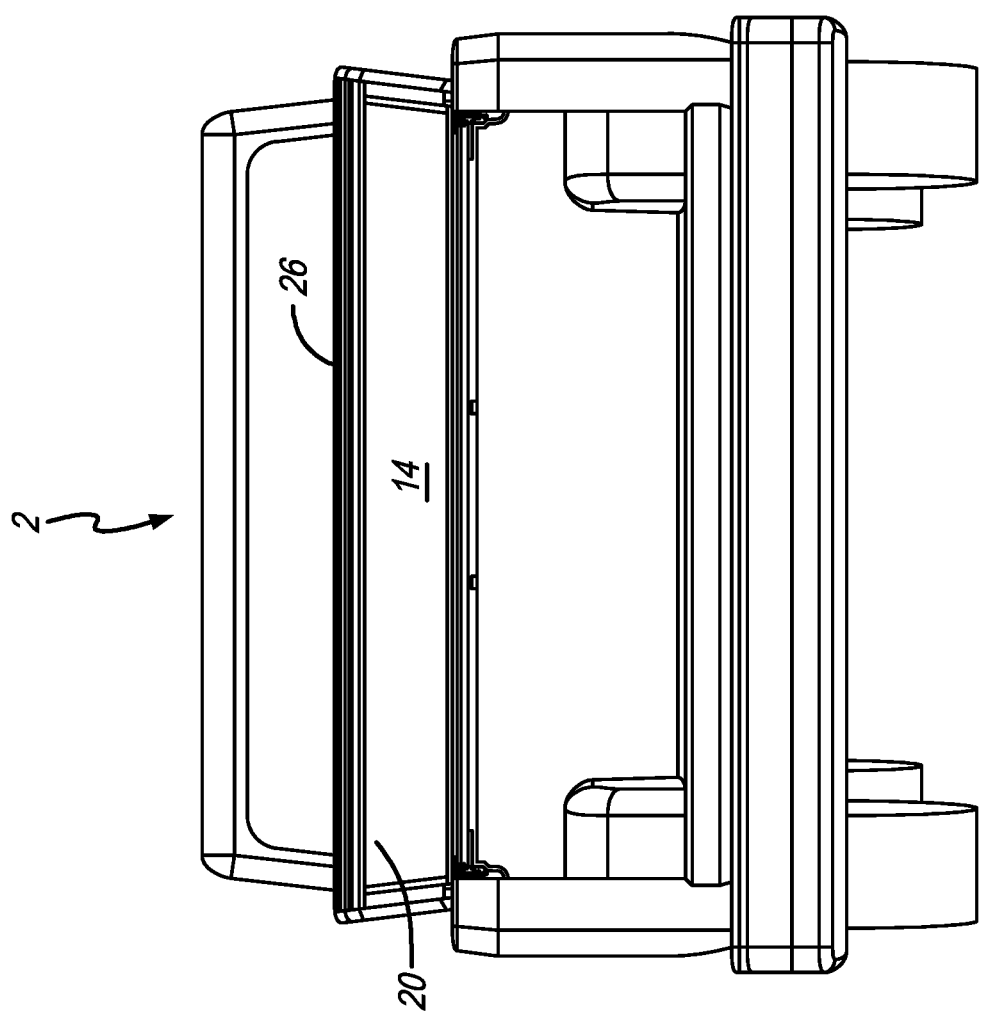
FIG. 4 is another rear perspective view of the truck with a tonneau cover in the folded up condition.

Another real perspective view of truck 2 is shown in FIG. 4. This view demonstrates how the panel sections such as panel section 14 may be pivoted upwardly in a vertical direction about hinge assembly 26 further uncovering bed 4. Also shown in this view is latching assembly 20. Illustratively, each panel section includes its own latching assembly to secure each panel section to truck 2.

Latching assembly 20 is the mechanism by which each panel section latches or secures to the vehicle to hold the panel section and, therefore, the cover (when all panel sections are latched) in place. In the illustrative embodiment, latching assembly 20 includes a pinch handle assembly located on each side of the panel section configured so that if one pinch handle is activated, it will not only move the latch closest to it, but will also move the latch distal from it so both latches are disengaged by actuating a single pinch handle.

In a further embodiment, the pinch handles may be attached to the frame portions of the panel sections and have a cover that may illustratively double as a connector piece allowing actuation of one pinch handle to also actuate the other pinch handle. The latching assemblies may further include integrated lights and engage a gusset or other support structure to hold the panel sections vertical when the cover is open.

Figure 5:
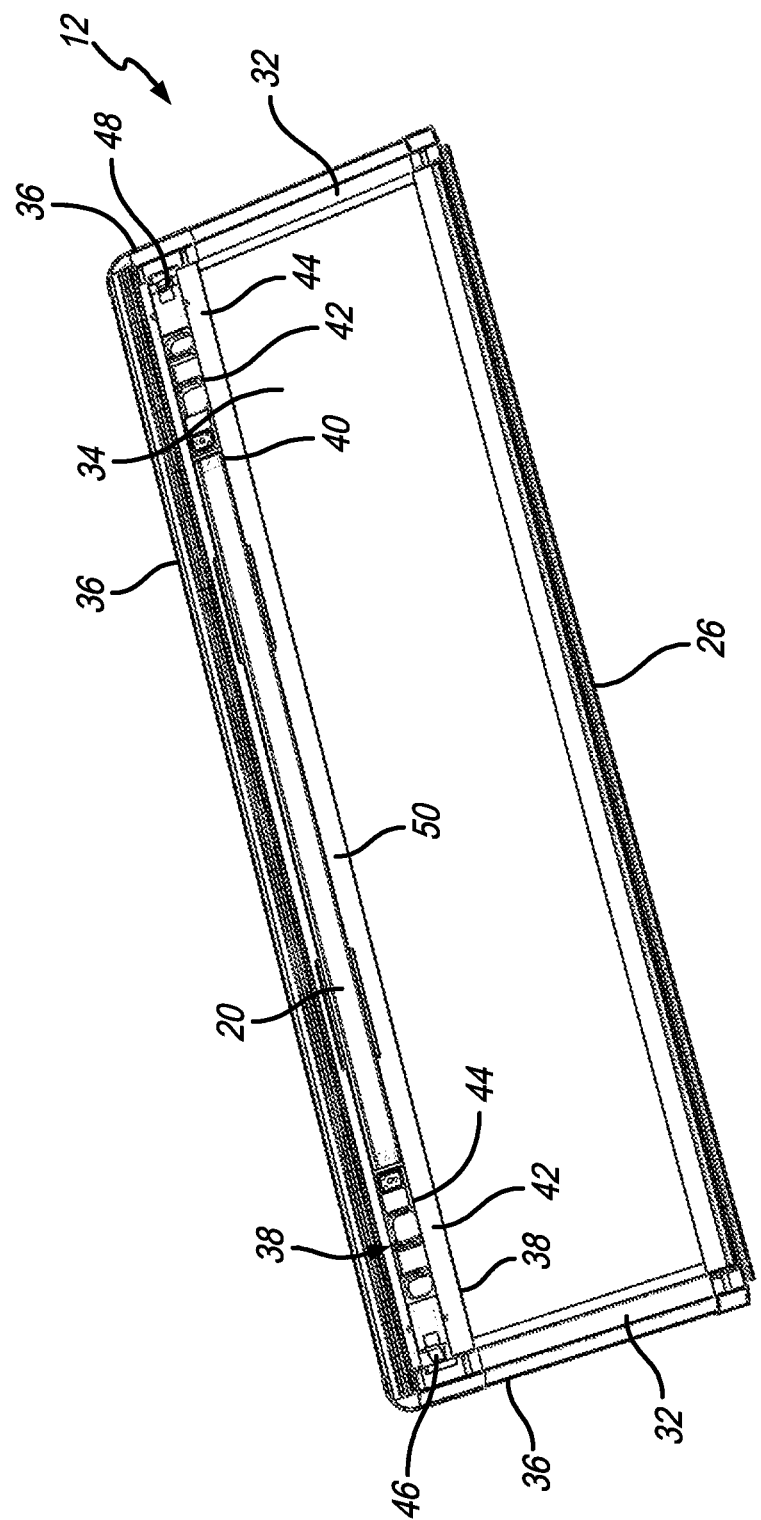
FIG. 5 is an underside perspective view of a panel section of the tonneau cover.

An underside perspective view of a panel section such as section 12 is shown in FIG. 5. This section includes frame 32 disposed about the general periphery of panel section 12 outlining panel 34. A flange edge 36 may extend from panel 34 and frame 32 about the periphery of panel section 12 to provide further covering and sealing capabilities between the cover and side walls (and tail gate) of the truck. It is appreciated that other panel sections 14 and 16 (not shown in this view, see FIG. 1) that are not the end most panel section 12 may have a flanged edge at their sides since they have a hinge on both of their ends. Accordingly, the illustrated panel section includes flange edge 36 extending from the periphery frame 32. As this is the furthest most panel from the cab of the vehicle, this portion of flange edge 36 may cover the seam between the tonneau cover and the tail gate. Also on the opposing end of panel section 12 is hinge assembly 26. As will be discussed further herein, hinge assembly 26 allows each panel section to be folded flat over another panel section and also folded up about vertical on base panel 18 to a stowed position.

Latching assembly 20 is shown integrated with underside frame 32, and illustratively including pinch latch assemblies 38 and 40. In an illustrative embodiment, pinch latch assemblies 38 and 40 each include latch handles 42 and 44 such that when pinched inward, they also move latches 46 and 48 illustratively inward to release same from clips mounted on the rails attached to side walls 6 and 8. A connector panel 50 illustratively attaches to both pinch latch assemblies 38 and 40. As discussed further herein, connector panel 50 is configured to move if either pinch latch assembly 38 or 40 is moved to unlatch its corresponding latch. Because connector panel 50 is connected to both assemblies, movement of the one assembly will cause the other assembly to move which in turn will pull the other latch releasing the same from the clip. This has the net effect of being able to activate just one of the pinch latch assemblies 38 or 40 to activate both latches 46 and 48 to disengage same from their corresponding rail clips. By doing this, the panel section can be moved. Accordingly, an operator needs to only be on one side of the vehicle bed to fully unlatch a panel section and move it out of the way.

Figure 6:
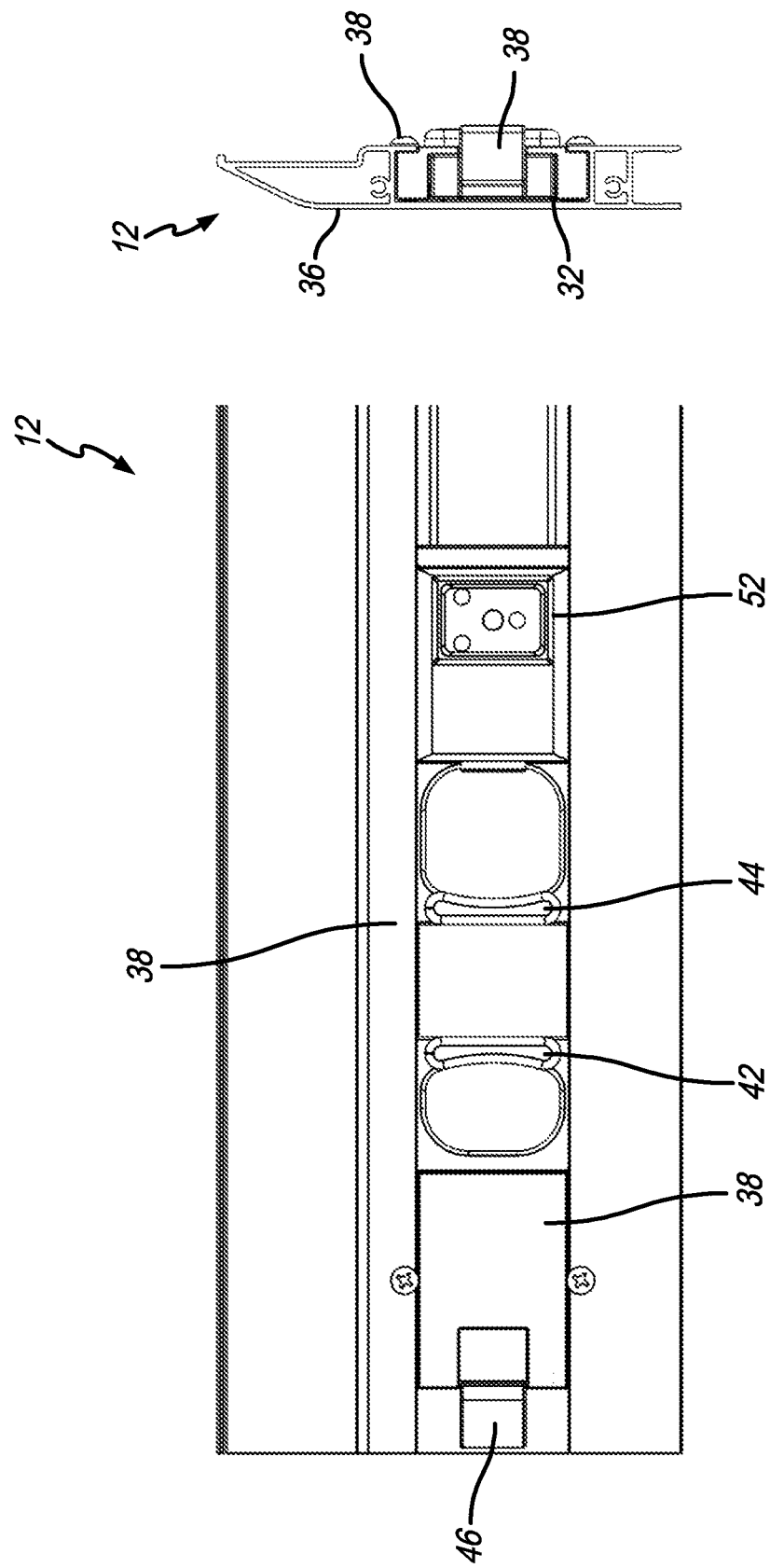
FIGS. 6A and 6B are underside, detail, and cross-sectional views of a panel of the tonneau cover.

Additional illustrative views of panel section 12 are shown in FIGS. 6A and 6B. These views specifically show front and side sectional views of pinch latch assembly 38. As shown in FIG. 6A, latch handles 42 and 44 are spaced apart from each other. As further shown herein, they are spring loaded so pinching them together will be illustratively against the bias of the spring. This will cause latch 46 to move inward which will disengage a clip attached to the rail which attaches to the side wall of the truck bed. The cross-sectional view also illustrates how pinch latching assembly 38 (as well as the others for that matter) may be part of frame 32 of panel section 12.

This illustrative embodiment also shows a light 52. Because these latch assemblies are located on the underside of the panel sections toward the interior of truck bed 4, these panel sections may block out some light. Light 52 positioned proximal to the latching assemblies allow locating the same easier while providing illumination inside the truck bed. This may be particularly useful if the panel section is lowered to its used position covering the truck bed.

Figure 7:
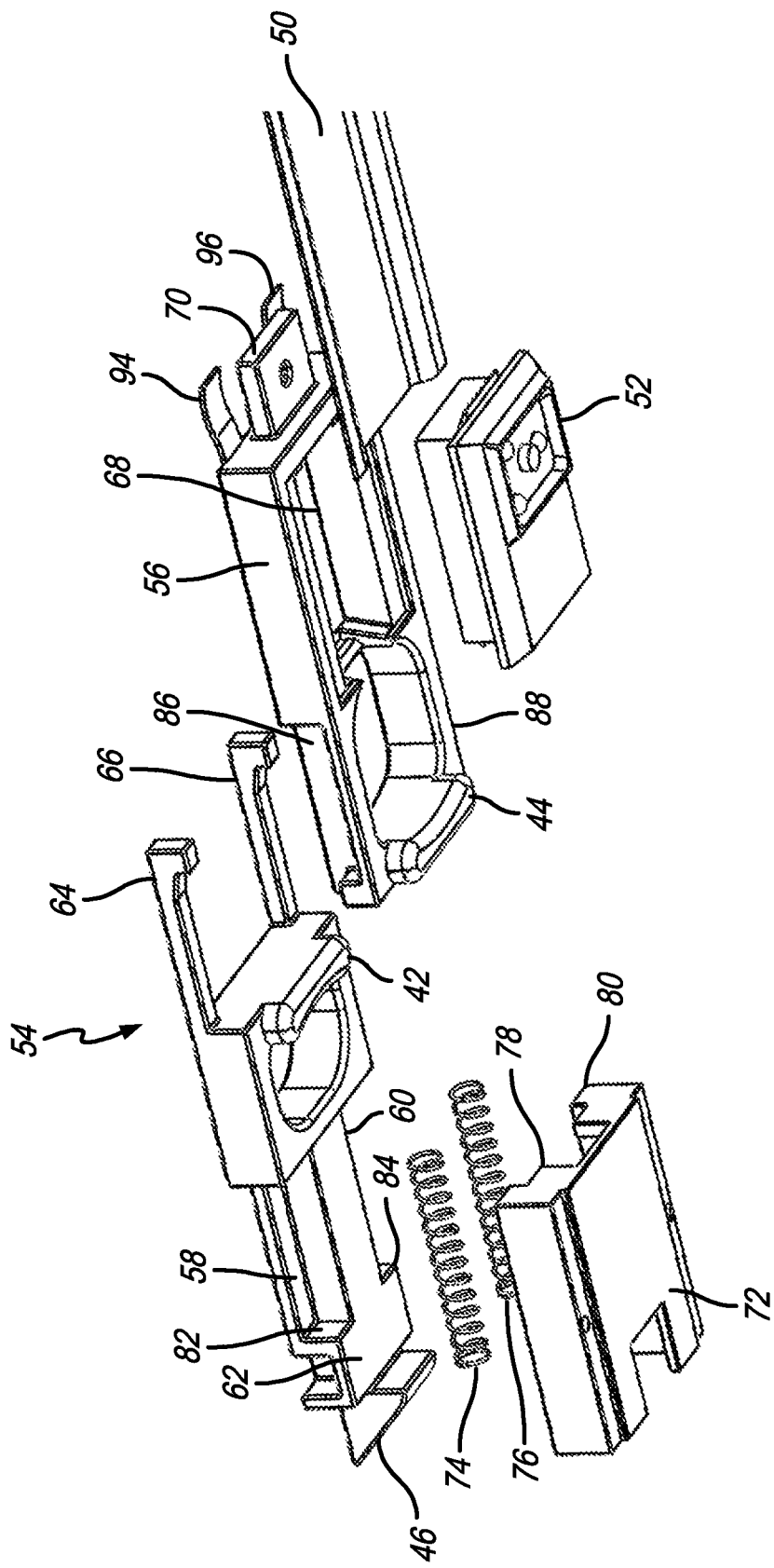
FIG. 7 is an exploded view of the latch and pinch handle assembly.

An exploded view of pinch latching assembly 38 is shown in FIG. 7. It is appreciated that the latching assemblies on each side of the panel section may be similar except for the positions of the corresponding latch and connector panel attachments. They are essentially positioned in reverse as shown herein. The primary components of this latch assembly 38 include latch pinch handle portion 54 and inner pinch handle 56. Latch handle portion 54 includes latch handle 42, spring pockets 58 and 60, spacer 62 and latch 46, and guide tabs 64 and 66. Inner pinch handle 56 may include a cavity 68 illustratively configured to hold a light, cover, or other structure. Handle 44 extends from inner pinch handle 56. A connector panel attachment tab 70 is located opposite latch 46 and configured to attach connector panel 50 to the opposing latching assembly. A latch guide 72 is attached to frame 32 (see also FIG. 11) or like portion of the panel section and receives latch springs 74 and 76. Additionally, springs 74 and 76 fit into spring pockets 58 and 60, respectively, of latch handle portion 54. Springs 74 and 76 bias against walls 78 and 80 of latch guide 72 as well as walls 82 and 84 of latch handle portion 54 to create a resistance force against the motion of travel that pulls latch 46 to the unlatching position (see also FIGS. 9 and 10). Guide tabs 64 and 66 fit in respective slots 86 and 88 in inner pinch handle 56 guides movement of inner pinch handle 56 which pulls on connector panel 50 causing the opposed latching assembly to unlatch as well. It is appreciated that the latch assemblies on the other panel sections may operate the same as described herein with pinch latching assembly 38.

Figure 16:
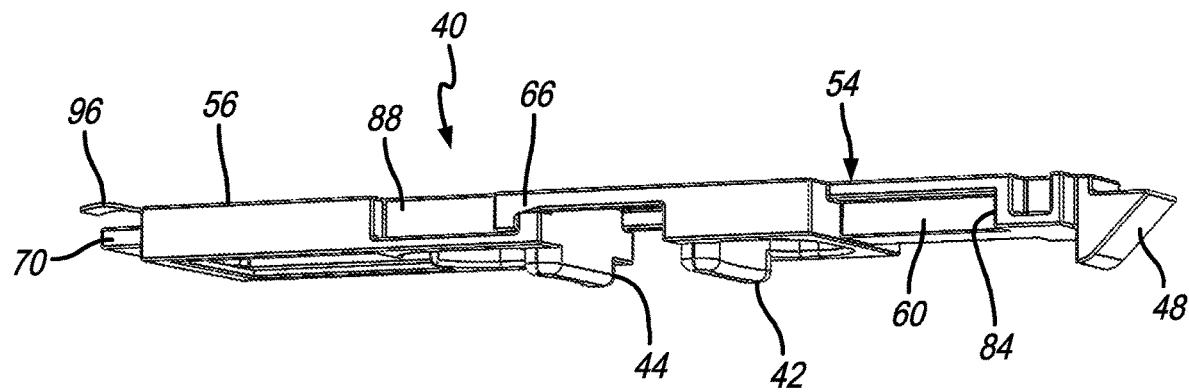
FIG. 16 is a side perspective view of the latch and pinch handle assembly.

A perspective view of pinch latch assembly 40 is shown in FIG. 16. Pinch latch assembly 40 is similar to that of pinch latch assembly 38 except it is oriented in reverse to latch the opposite side wall with latch 48. Otherwise, the structures as shown, such as spring pocket 60, latch handles 42 and 44, slot 88 of inner pinch handle 56 are the same as that of latch assembly 38 but operate in mirror image to same.

It is further appreciated that because each of the pinch latching assemblies 38 and 40 (see, also FIG. 5) have their own springs 74, 76 that bias in opposite directions, they cause latch handles 42 and 44 to bias away from each other. Pinching handles 42 and 44 together is what causes both latches 46 and 48 to move to the unlatched position (see, also, FIGS. 9 and 10). In other words, pinching handles 42 and 44 of assembly 38 towards each other compresses springs 74, 76 pulling latch 46 inward against the spring bias to the unlatched position. Because latching assembly 38 also pulls on the other latching assembly 40 via connector panel 50. latching assembly 40 compresses its springs 74, 76 in an opposite direction from springs 74, 76 of latching assembly 38. A tension from both spring sets is created that creates the resistance force on handles 42 and 44 which move latches 46, 48 to the unlatched position, and biases latches 46 and 48 back toward their original latched position.

Figure 8:
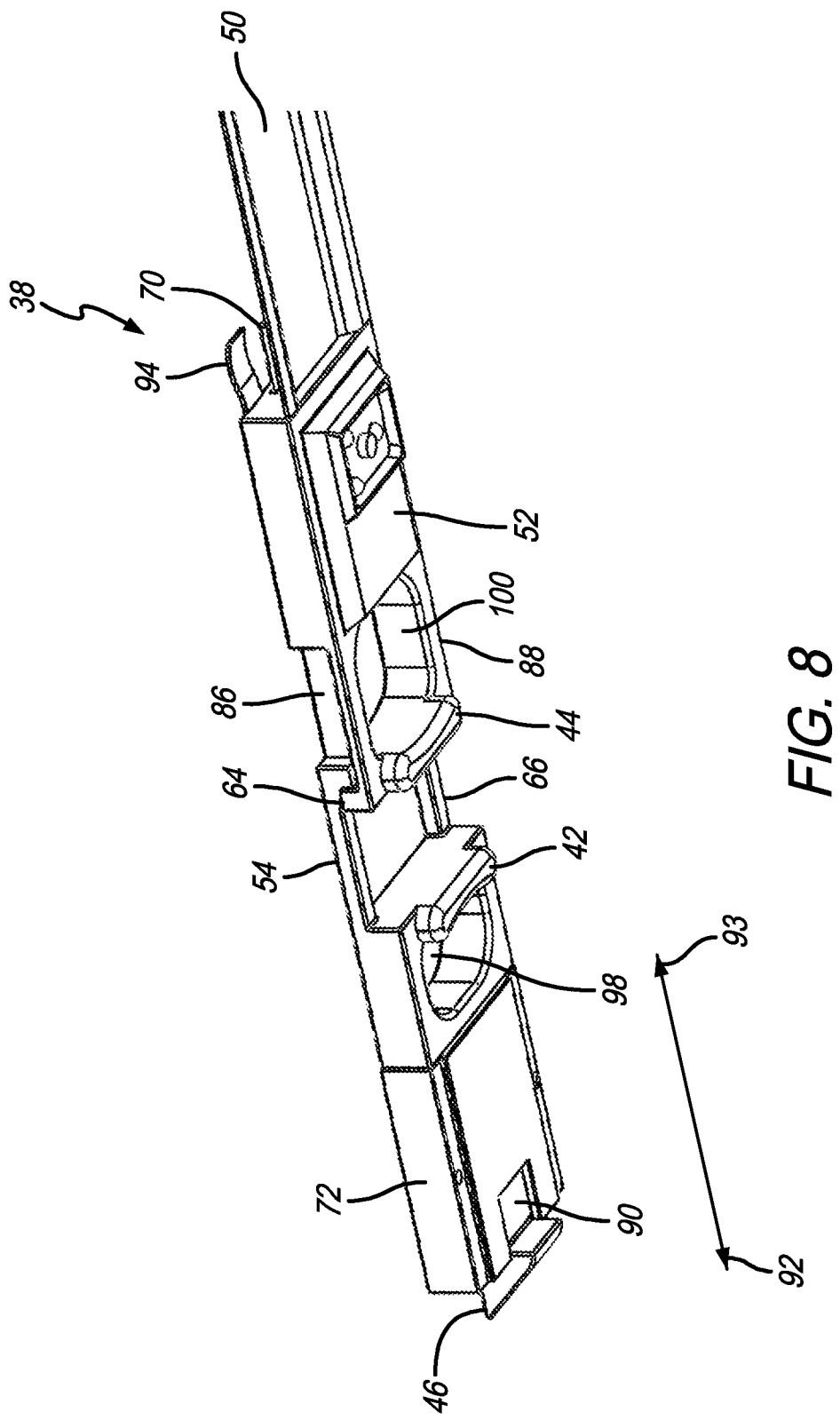
FIG. 8 is an isolated perspective view of the latch and pinch handle assembly.

A perspective view of pinch latching assembly 38 is shown in FIG. 8. This view depicts the relative positioning of the structures as discussed in FIG. 7. As shown, latch guide 72 shrouds a portion of latch handle portion 54, and includes opening 90 to accommodate movement of latch 46 in directions 92 and 93. Latch handles 42 and 44 are separated from each other by guide tabs 64 and 66, each located in slots 86 and 88, respectively. Connector panel 50 is shown attached to connector panel attachment tab 70.

Spring tabs 94 and 96 (see also FIG. 7) serve to reduce vibration in the latching assembly. Also shown in these views are pockets 98 and 100 illustratively sized to accommodate fingers to aid in moving latch handles 42 and 44.

Figure 10A:
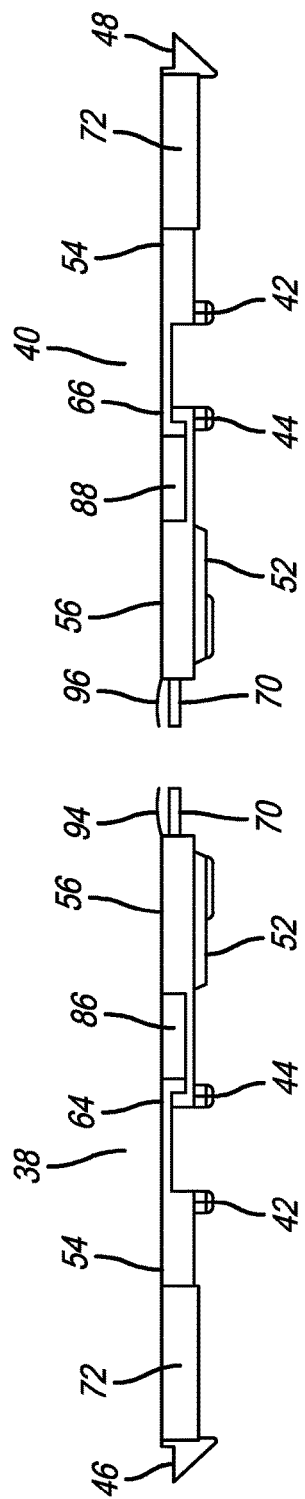
FIGS. 10A and 10B are additional views showing the operation of the latch and pinch handles.
Figure 10B:
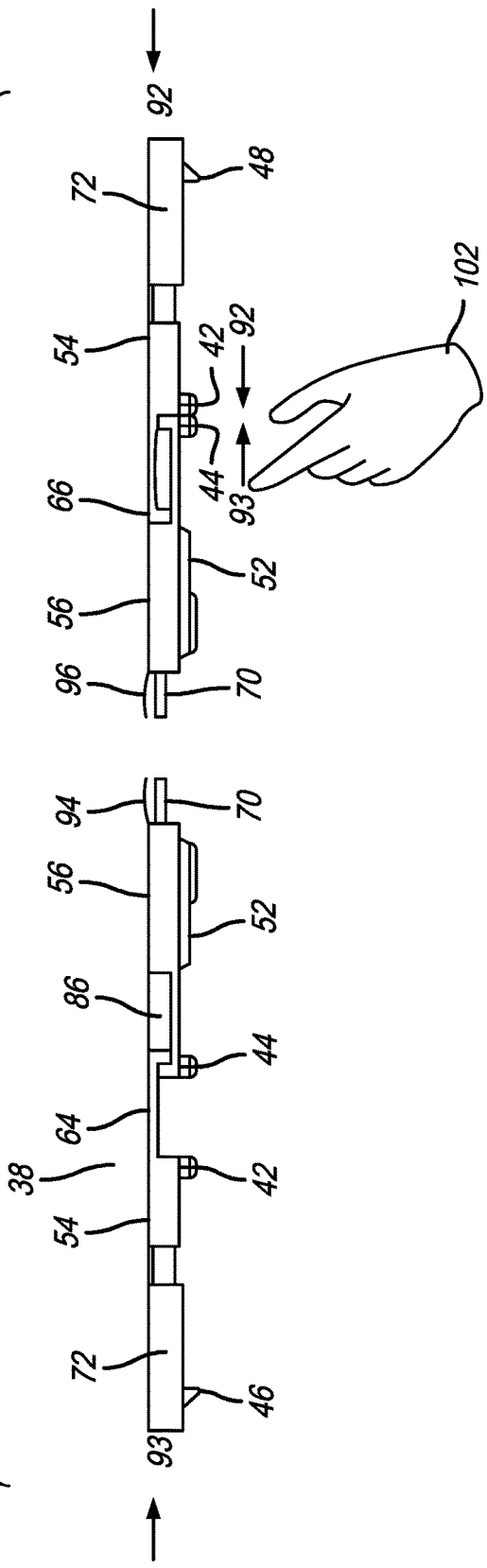

Side views of pinch latch assemblies 38 and 40 are shown in FIGS. 9 and 10 demonstrating how they operate. As shown in FIG. 9A, both pinch latch assemblies 38 and 40 have their latches 46 and 48 located in their extended latched position. This means when the panel sections are secured in a latched position, that portion of the cover is latched to clips on the rails of the truck bed side walls. To unlatch both pinch latch assemblies 38 and 40 at the same time, latch handles 42 and 44 can be pinched together in directions 93 and 92 by hand 102. This causes latch handle portion to move in direction 93 while inner pinch handle 56 moves in direction 92. This causes latch 46 to also move in direction 93 relative to latch guide 72, having the effect of pulling it away from the rail clip, thereby providing clearance to lift on the panel section. The resistance caused by springs 74 and 76 (see also FIG. 7) creates both a resistant force on the fingers when moving latch handles 42 and 44, and causes latch 46 to snap back in direction 92 towards the clip to return latch 46 to its latching condition without further operator effort. At the same time, with inner latch pinch handle moving in direction 92, it pulls on pinch latch assembly 40 in direction 92 as well. This causes inner pinch handle 56 from pinch latch assembly 40 to be pulled in direction 92 which also pulls latch handle portion 54 of pinch latch assembly 40 in direction 92 as well via guide tabs 64 and 66 (see also FIG. 7). As shown in FIG. 9B, inner pinch handle 56 pulls on guide tabs 64 and 66 to essentially pull latch 48 from the clip and the side rail, thereby moving latch 48 to its unlatched position. It is, therefore, appreciable from these two views how pinching the latch assembly on one side, not only moves the latch on that side to the unlatched position, but moves the latch on the other side to the unlatched position as well. Again, this has the effect of being able to unlatch both sides of a panel section from just one side of same.

Conversely, as shown in similar views in FIG. 10, hand activation of pinch latch assembly 40 may actuate not only latch 48 but latch 46 on pinch latch assembly 38 as well. As shown in FIG. 10A, pinch latch assemblies 38 and 40 are both in the latched condition similar to that shown in FIG. 9A. This time, when hand 102 pinches latch handles 42 and 44 in directions 92 and 93, respectively, latch 48 has moved in direction 92 as well, recessing it in latch guide 72. Again, this is the recessed condition for pinch latch assembly 40. At the same time, guide tab 64 pulls on inner pinch handle 56 which pulls on the corresponding inner pinch handle 56 of pinch latch assembly 38. This pulls on guide tab 64 to pull latch handle portions 54 in direction 93 thereby pulling latch 46 in direction 93 as well. Clearing it from the clip on the side rail thereby now being positioned in its unlatched condition.

Figure 11:
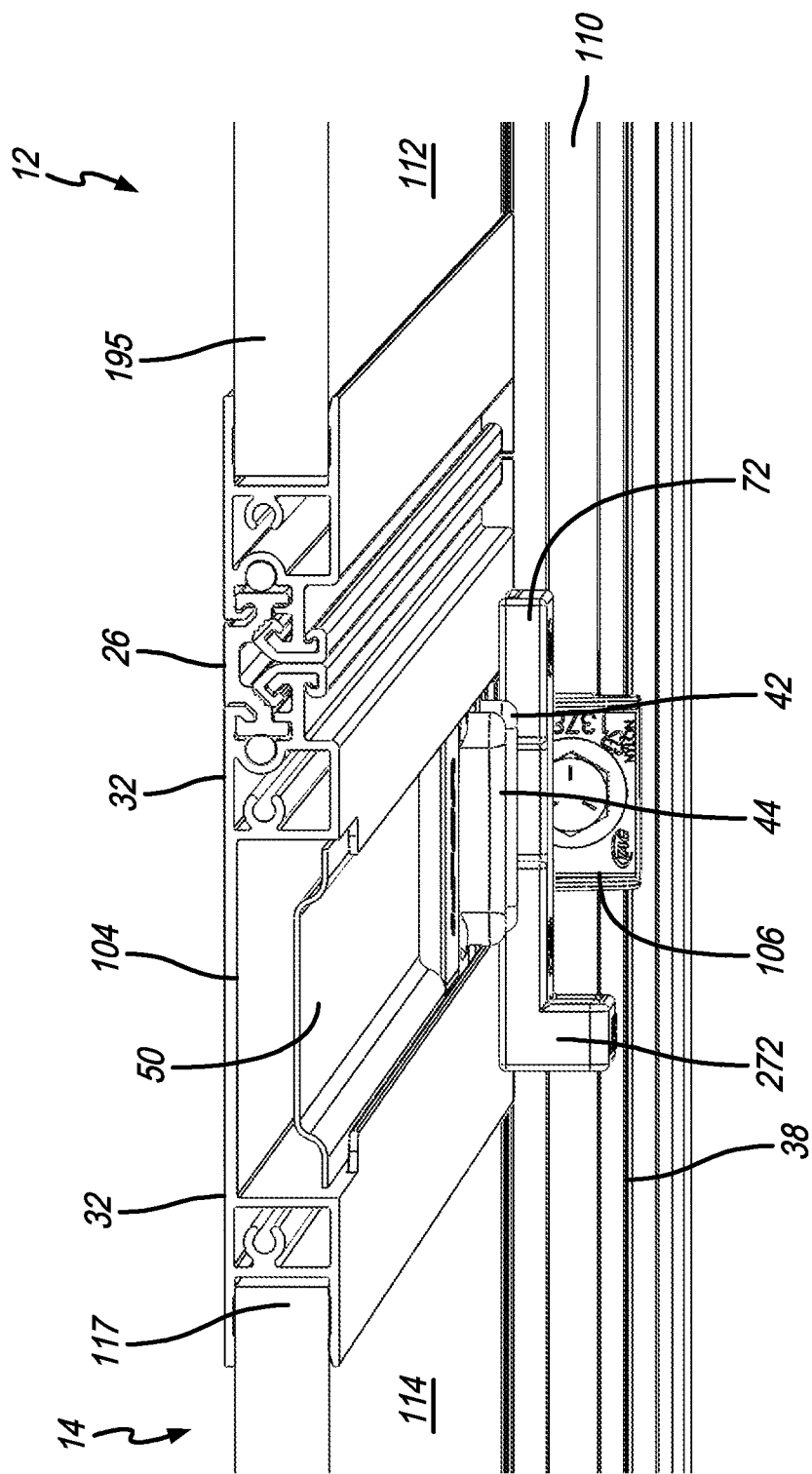
FIG. 11 is a perspective cross-sectional view of a portion of the panel section with the latch and pinch handle assembly fitted therein.

A cut-away perspective detail view of panel sections 12 and 14 are shown in FIG. 11. This view shows how connector panel 50 fits in a pinch handle channel 104 formed in a portion of frame 32 in each of panel section 12 and 14. Adjacent pinch channel handle is hinge assembly 26 that hingedly connects the panel sections together. Pinch latch assembly 38 is shown including latch handles 42 and 44 and latch guide 72. Clip 106 is shown attached to rail 110. Latch 48 (not visible in this view) engages clip 106 to secure the panel section to the vehicle. This view further illustrates how the panel sections may be constructed. As shown, panel member 112 is fitted in a receptacle 115 of hinge assembly 26. The same is illustratively the case with panel member 114 fitting in receptacle 117 of frame 32.

Figure 12:
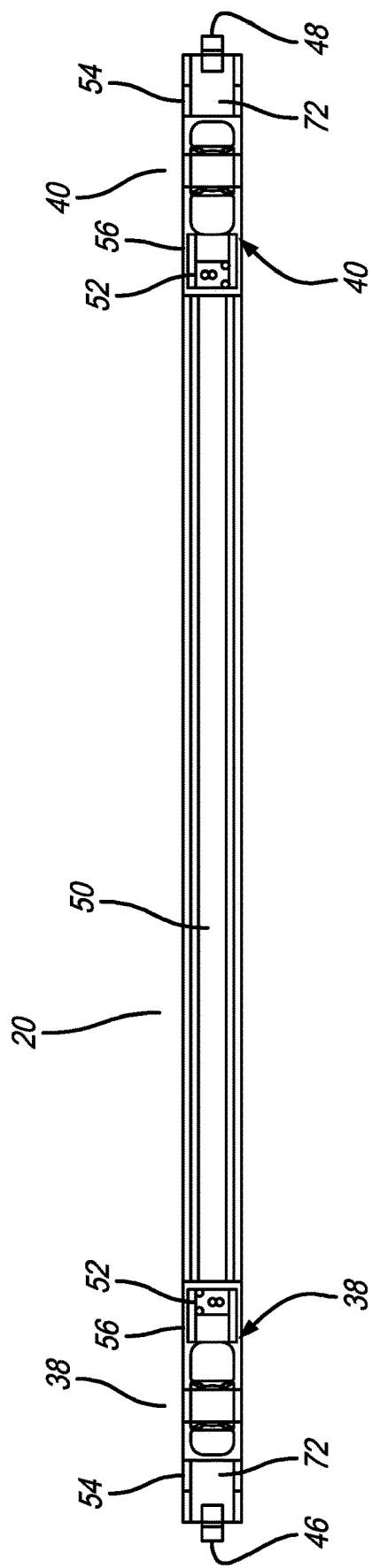
FIG. 12 is an underside view of the latch and pinch handle assemblies used with a panel.

An underside view of latch assembly 20 is shown in FIG. 12. This view illustrates the configuration of two pinch latch assemblies 38 and 40 with connector panel 50 extending between and connecting them together. It is appreciated that a latching assembly is attachable to each of the panel sections 12, 14, and 16 to secure and release them. Also shown in this view are lights 52 and latches 46 and 48.

Figure 13:
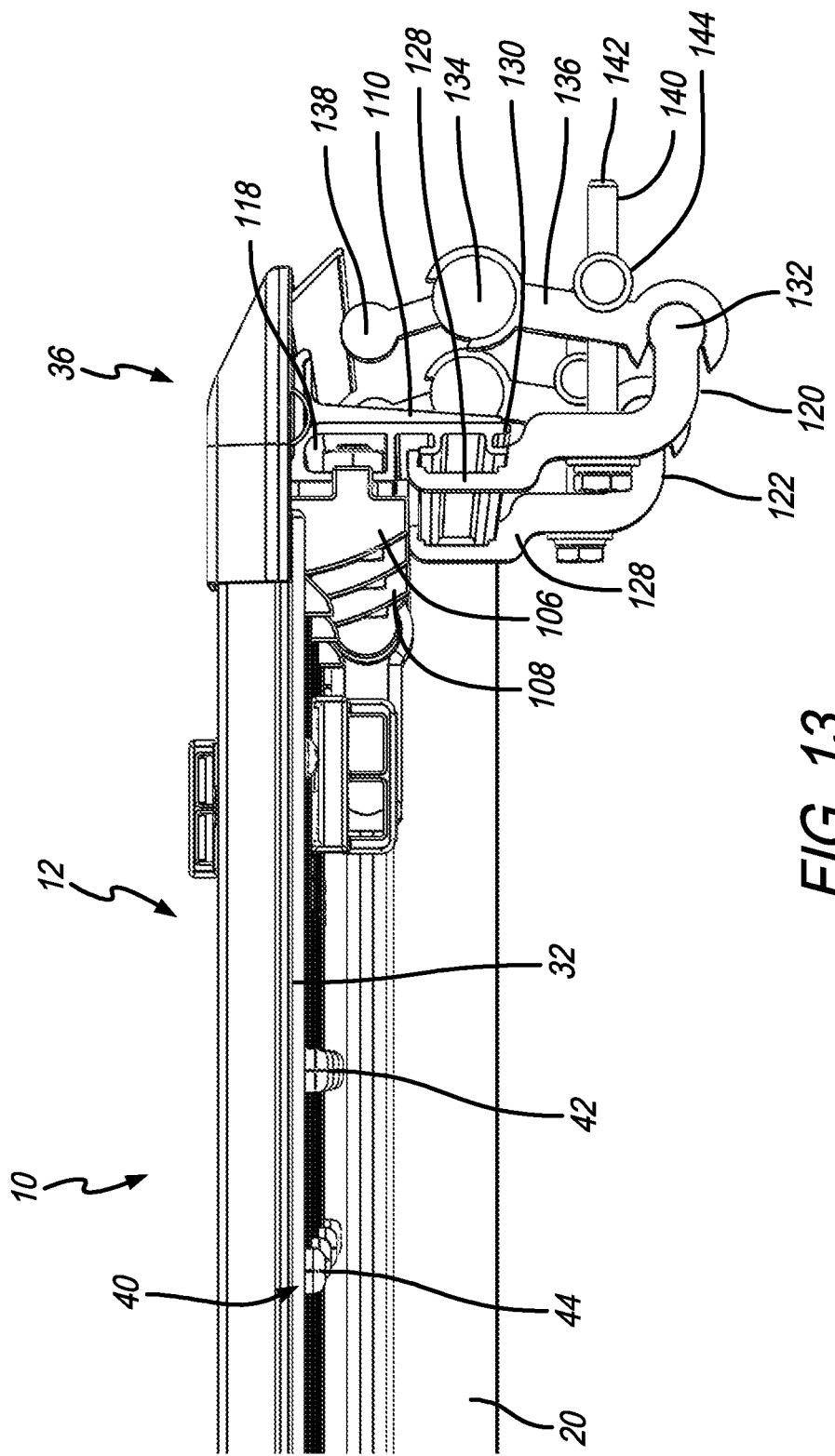
FIG. 13 is a partial end detail view of a panel portion of a tonneau cover.

A partial end view of tonneau cover 10 isolated from truck 2 is shown in FIG. 13. This view shows how latching assembly 20 fits essentially flush with frame 32 of panel section 12 (same applies to the other panel sections) with extending latch handles 42 and 44 extending downwardly as a touch point for easy locating and accessing. As further shown in the illustrative embodiment, all the latching assemblies are aligned behind the first one to maintain a consistent location of touch points to also make it easy to locate and activate additional panel sections once the first panel section is folded up. Flange edge 36 is shown extending from the edge of frame 32 and illustratively extending over rail 110. In the illustrated embodiment, clip 106 along with clip 108 are fitted in a logistic track 118 of rail 110. Clips 106 and 108 are configured to receive the latches from the latch assemblies at a location extended outward and above logistic track 118 and rail 110. Additionally, a plurality of rail brackets, such as rail brackets 120 and 122 shown, each include hook portion 128 configured to engage rail flanges 130 on rail 110. Rail brackets 120 and 122 also include joints 132 and 134 to movably engage arms 136 and 138, respectively, to help brackets 120 and 122 secure to the side wall of truck 2. It is contemplated that truck side walls come in different sizes and configurations. The adjustability of brackets 120 and 122 allow engagement with any variety of such bed walls. Fastener assembly 140, which includes a bolt 142 and fastener receptacle 144 is configured to securely fasten rail 110 to the side wall of a truck bed using rail brackets 120 and 122. It is appreciated that additional brackets may be used if needed to secure the rail.

Figure 14:
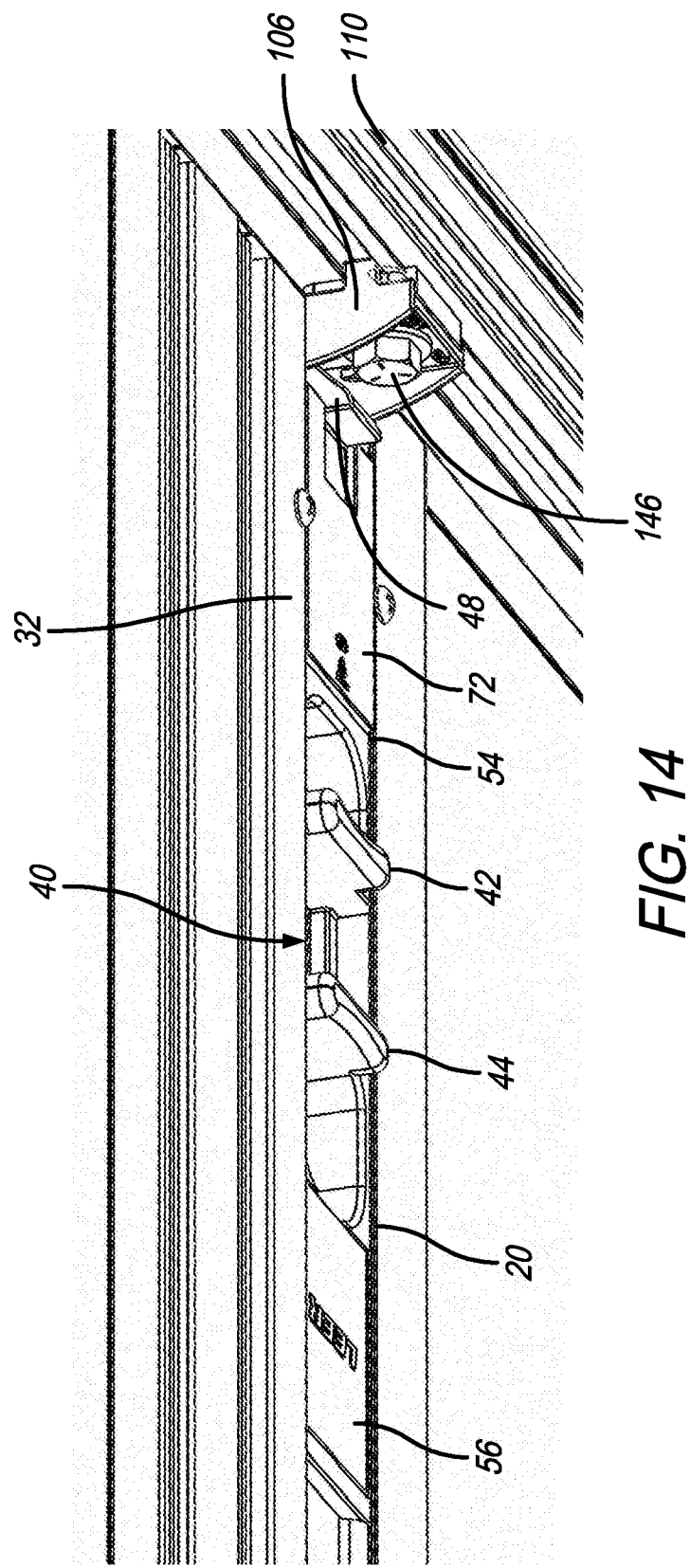
FIG. 14 is an underside partial perspective view of a portion of the panel section of the of the tonneau cover showing the latch and pinch handle assembly.

An underside partial perspective view of a panel section with latching assembly 20 attached to frame 32 is shown in FIG. 14. This view depicts how latch handles 42 and 44 serve as touch points to engage for unlatching the panel section. The view also shows latch 48 engaged with clip 106 to secure the panel section to the bed wall. As shown in this illustrative embodiment, clip 106 is attached to logistic track 118 and rail 110 via fastener 146. It is appreciated that other attachment means may be used to attach the clip to the rail. It is further appreciated that the clip is adjustable along the rail to conform the tonneau cover to the particular size of the truck bed.

Figure 15A:
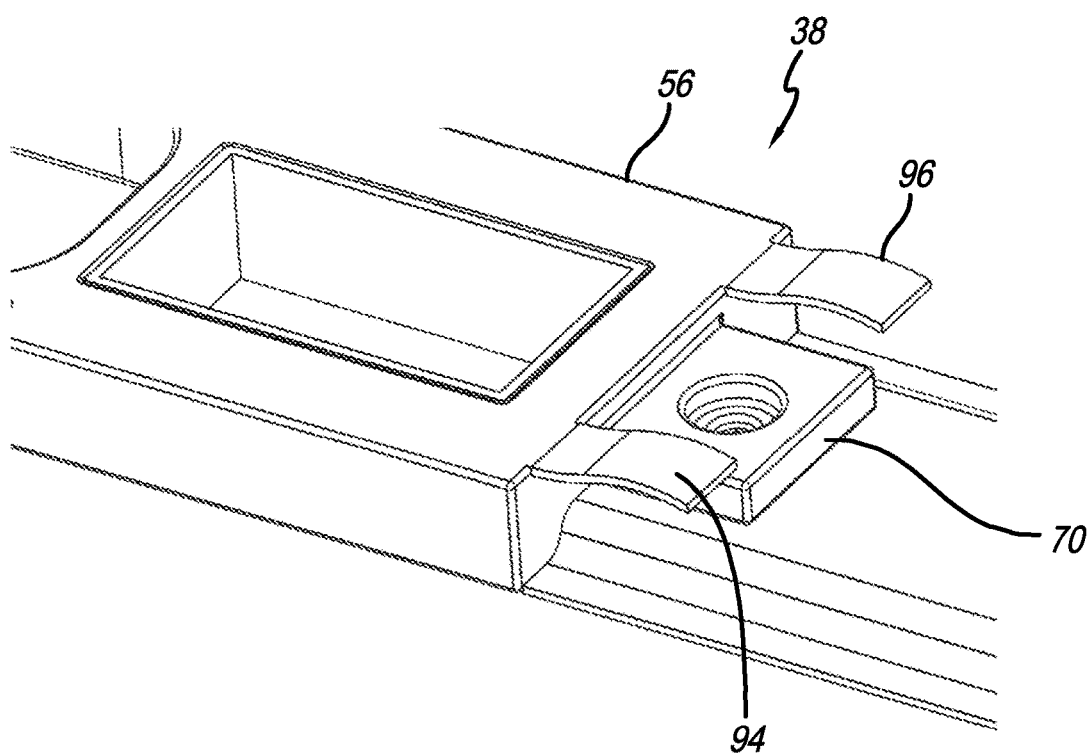
FIGS. 15A and 15B show portions of the pinch handle portion of the latch and pinch handle assembly.
Figure 15B:
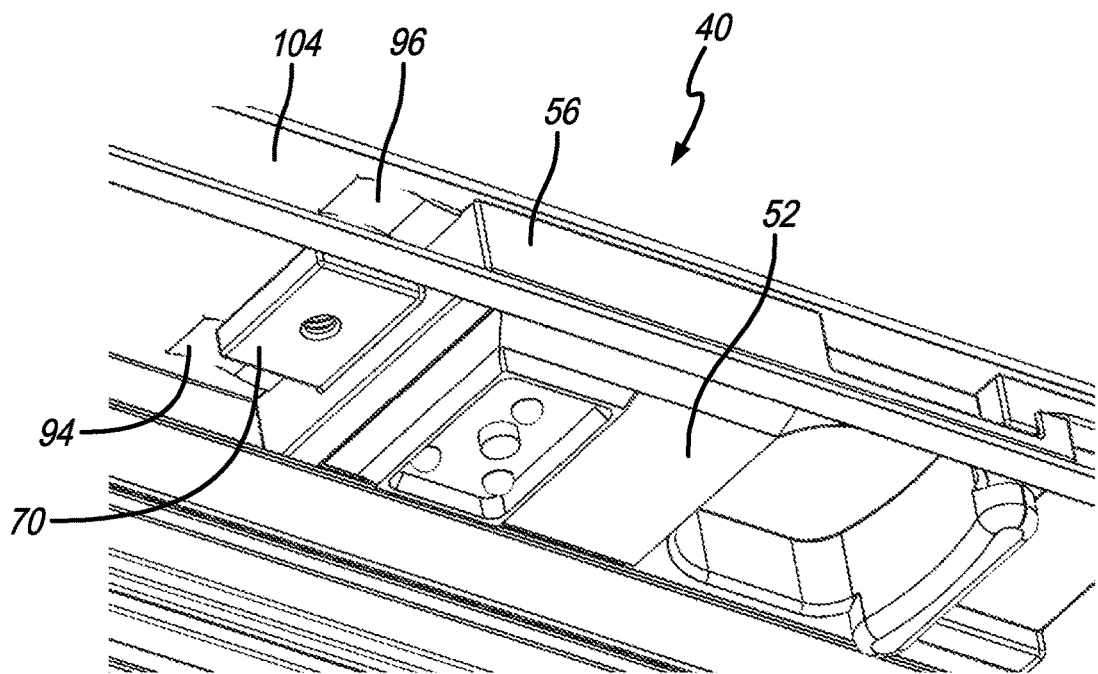

Perspective views of portions of pinch latch assemblies 38 and 40 are shown in FIGS. 15A and B respectively. These views show spring tabs 94 and 96 on inner pinch handle 56 for each pinch latch assemblies 38 and 40. Spring tabs 94 and 96 are located in proximity to connector panel attachments 70 and press against connector panel 50 (see FIG. 11) when attached to connector panel attachment tabs 70 to minimize movement and noise by the latching assembly while the truck is moving. The view in FIG. 15 further shows how pinch latching assembly 40 fits into pinch handle channel 104 (pinch latch assembly 38 operating the same way).

Figure 17:
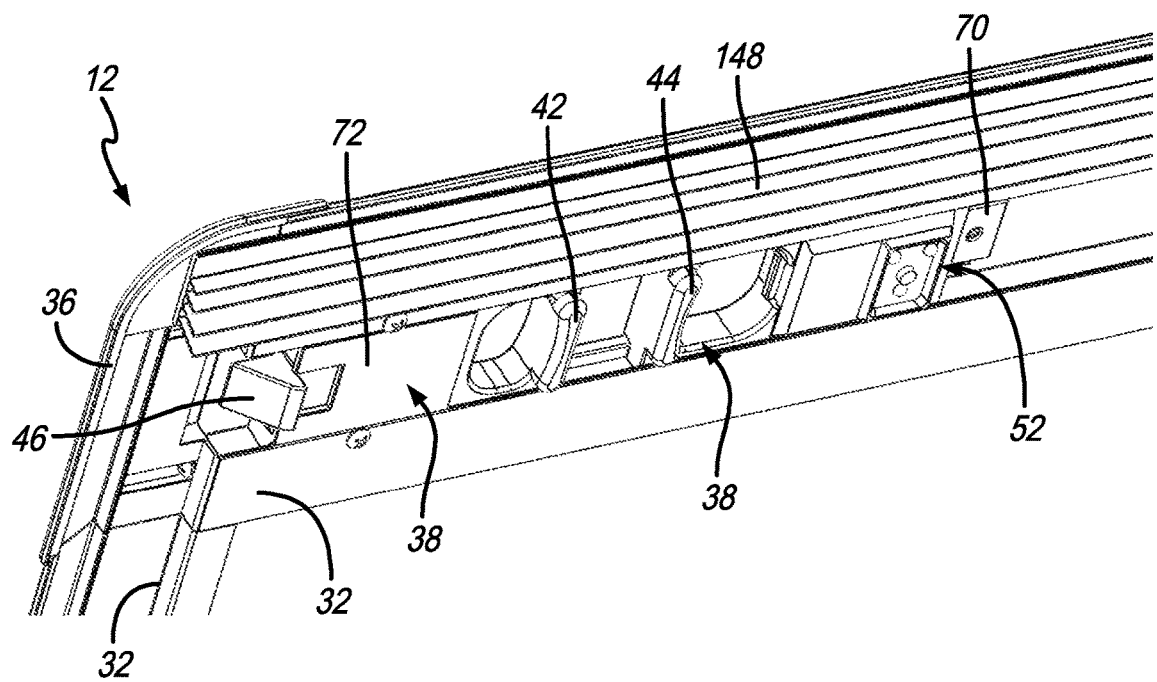
FIG. 17 is a underside perspective view of a portion of a panel section from the tonneau cover showing a light with the latch and pinch handle assembly.

An underside detail perspective view of a portion of panel section 12 is shown in FIG. 17. This view further demonstrates how pinch latch assembly 38 fits into frame 32. Such recess allows latch 46 to engage the clip such as clip 106 underneath the panel section, which is helpful for security. Such recess also allows for an unobstructed use of the truck's cargo area. Having no protrusions extending from the cover means no obstructions from the cover when loading or unloading the truck.

Also shown in FIG. 17 is flange edge 36. Unique to panel section 12, which is the end-most panel located not only adjacent the side walls but also the tailgate, may illustratively include a gasket seal 148 to assist sealing between the top edge of the tailgate and the cover. This assists preventing water from seeping in between the two structures. It is also appreciated that by "seal" it is not intended to mean a seal to the extent the interior of the truck bed necessarily becomes an air tight vessel. Also shown in this view is light 52.

Figure 18:
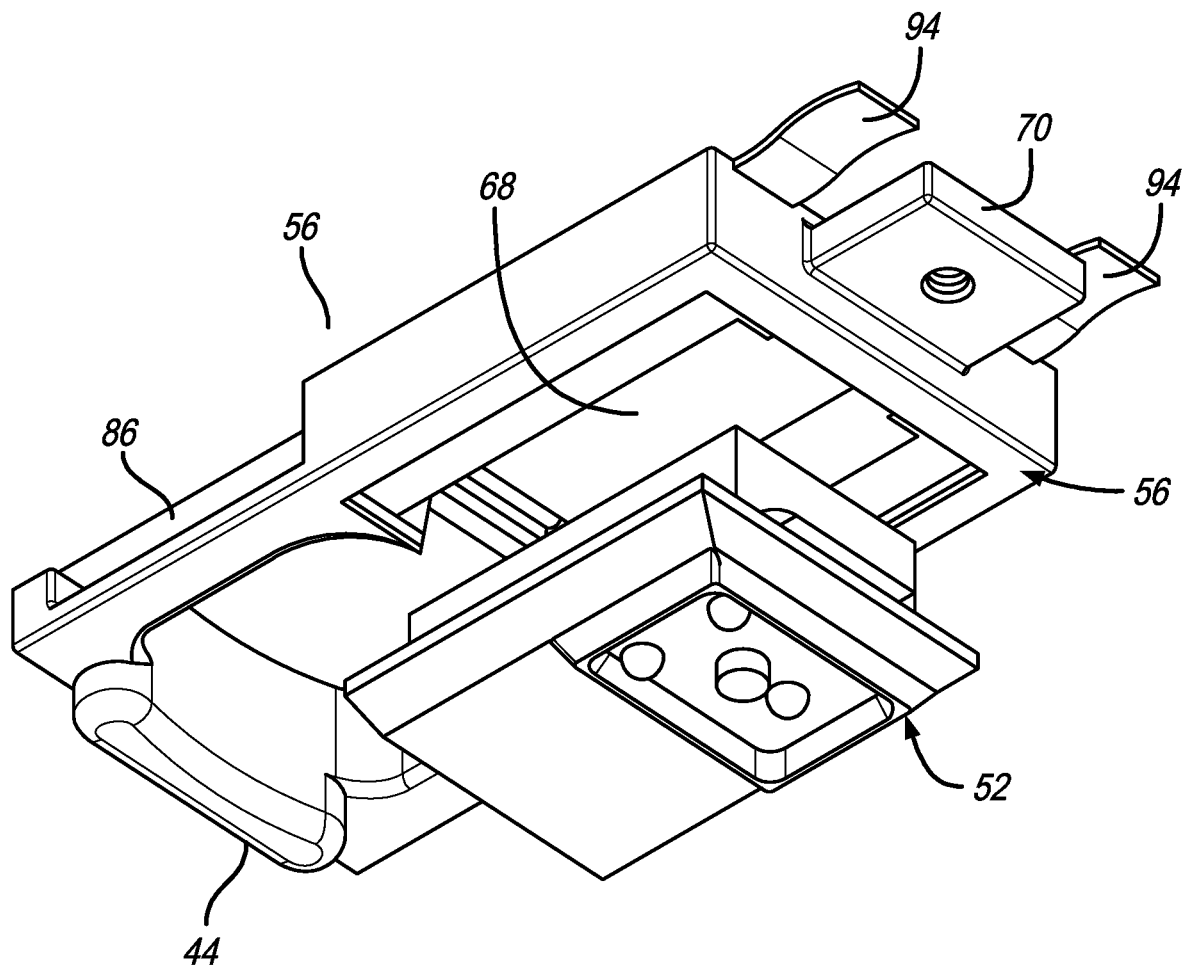
FIG. 18 is a partially exploded view showing the light and the inner pinch handle.

A partial exploded view of inner pinch handle 56 with light 52 is shown in FIG. 18. This view demonstrates how light 52 is configured to fit into cavity 68 of inner pinch handle 56. Again, the proximity of the light to the pinch handle not only provides illumination to the inside of the truck bed, but may also serve as a location indicator for the pinch handles. Even further, light 52 may be removable as shown and serve as a flashlight. It is appreciated that light 52 may be battery operated, have manual on/off switch or a sensor switch to activate upon some occurrence such as hand movement.

As previously discussed, tonneau cover 10 includes panel sections 12, 14, and 16 that are folded up to be stored in vertical fashion on base panel section 18. In order to assist holding the panel sections upright, a vertical gusset assembly 22 (see FIG. 19) may be employed. When not in use, gusset assembly 22 stows under the panel section frame. The gusset assembly moves in the direction of the width of the bed rather than the length of the bed. In other words, to move the gusset between use and stowed positions, it is rotated about an axis that is longitudinal to the truck bed instead of lateral. Latches 46 and 48 may be employed to hold the gusset in place while the panel sections are positioned vertically. Lastly, they are designed to be quickly attached and removed making the process convenient.

Figure 19:
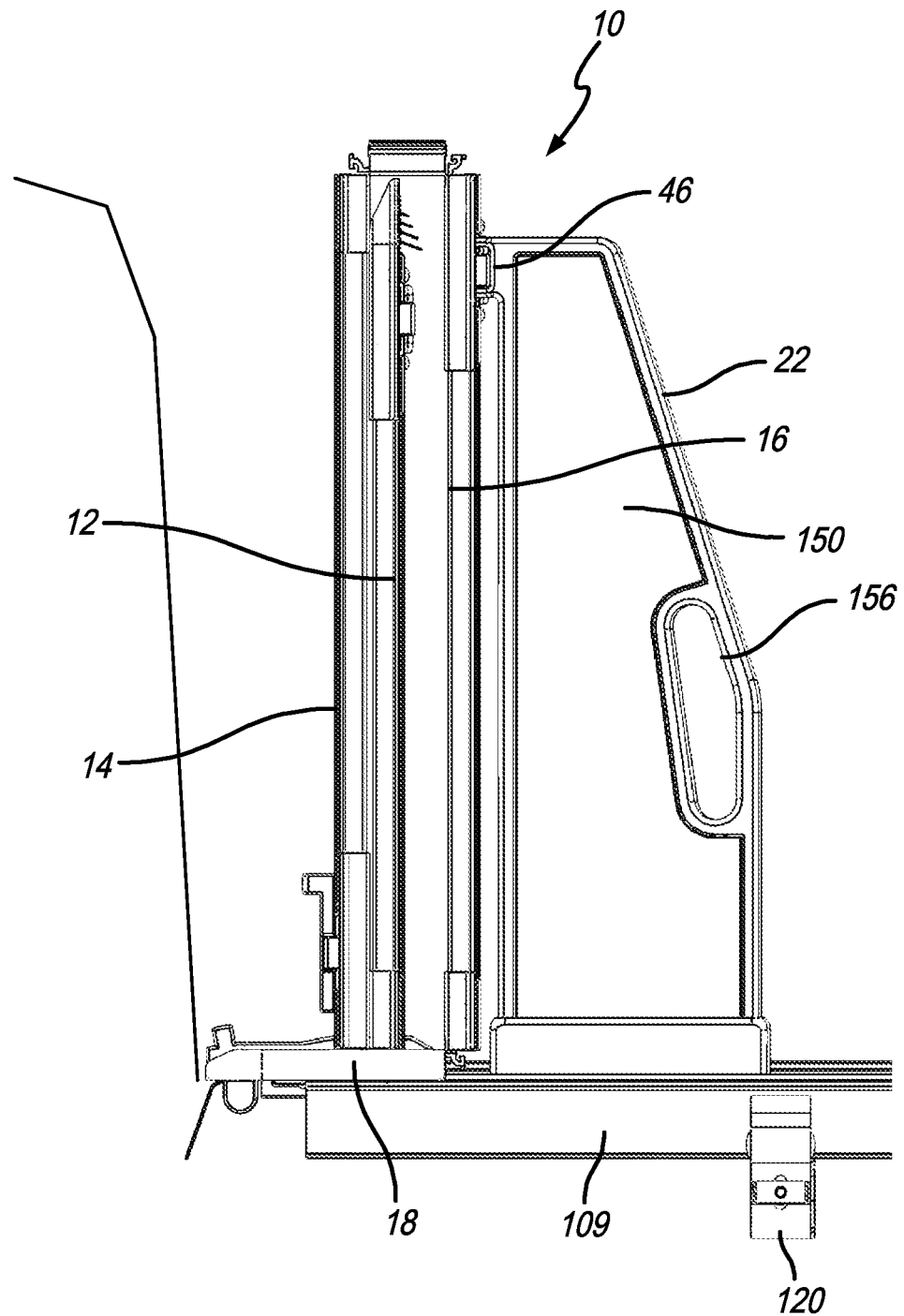
FIG. 19 is a side view of a portion of the truck showing the tonneau cover located in its raised stowed position supported by a gusset.

A side detail view of a portion of the truck showing tonneau cover 10 with its panel sections 12, 14, and 16 raised to their stowed position on base panel 18, and supported by gusset assembly 22, is shown in FIG. 19. As demonstrated in this view, a gusset 150 is coupled to both rail 109 and latch 46. This arrangement provides both horizontal and vertical securement means cover 10 will be held vertically in place. This arrangement may be employed on rail 110 as well.

Figure 20:
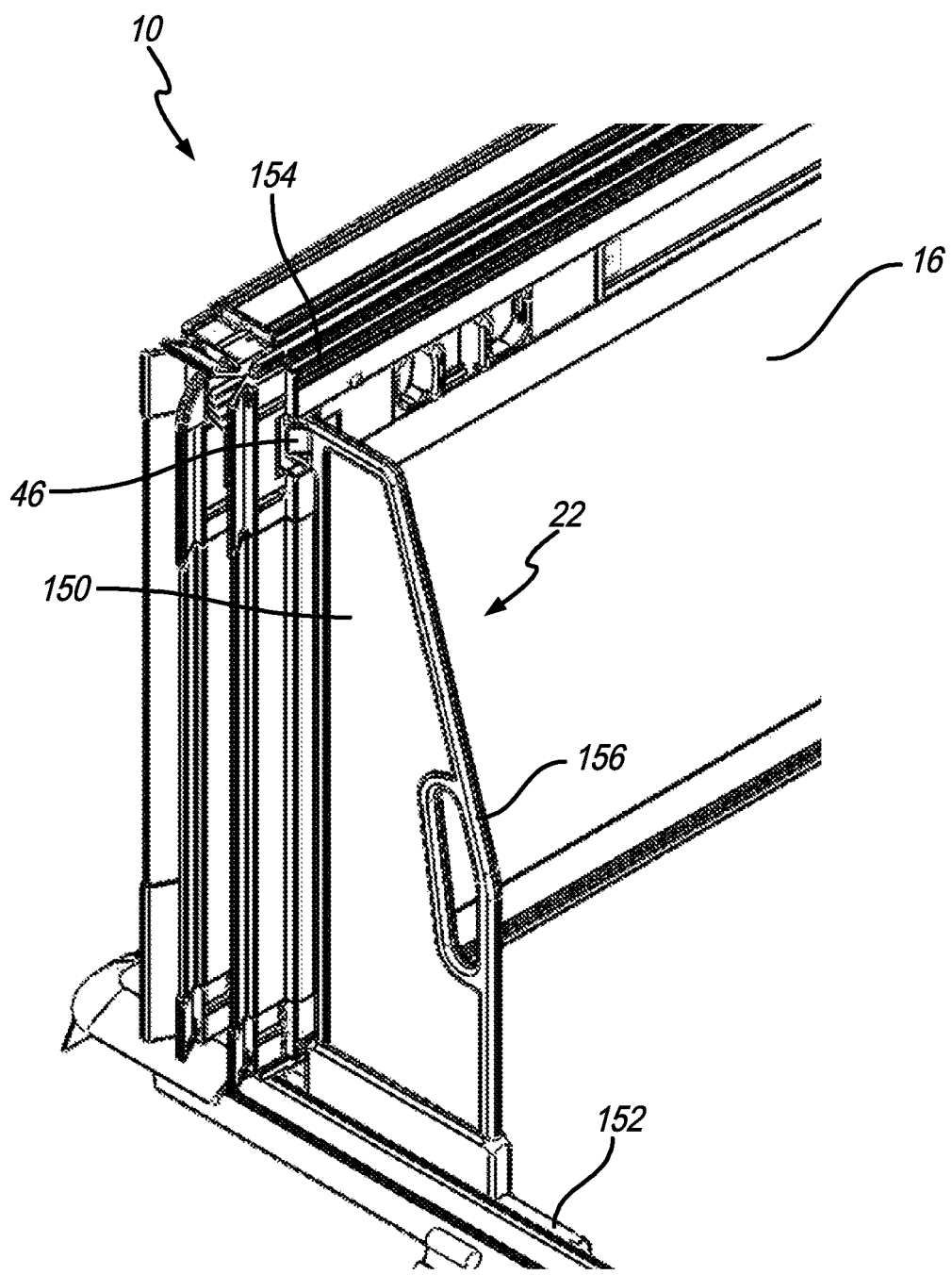
FIG. 20 is a perspective view of the tonneau cover located in its stowed position similar to FIG. 19.

A detail perspective view of a portion of cover 10 with gusset assembly 22 coupled thereto is shown in FIG. 20. This view depicts how gusset 150 is a panel that has a lower end 152 that fits into a logistic track on rail 109 and is positioned upward so it will engage latch 46. It is appreciated that although the description with gusset 22 is made relative to latch 46 and panel section 16, gusset assembly 22 may be applicable to latch 48 on the other panel sections as well. In any event, gusset 150 includes an aperture 154 configured to receive latch 46. Accordingly, gusset 150 is able to hold the panel sections upright. In an illustrative embodiment, a handle 156 is part of gusset 150 allowing an operator to more easily hold and manipulate the gusset.

When not in use, gusset 150 is configured to pivot towards space 158 in bed 4 to be stowed out of the way underneath the section panels. In other words, the gusset may be supported underneath the panel assembly when not in use and then pivoted upwards to hold the panel sections in an upright position when in use.

Figure 21:
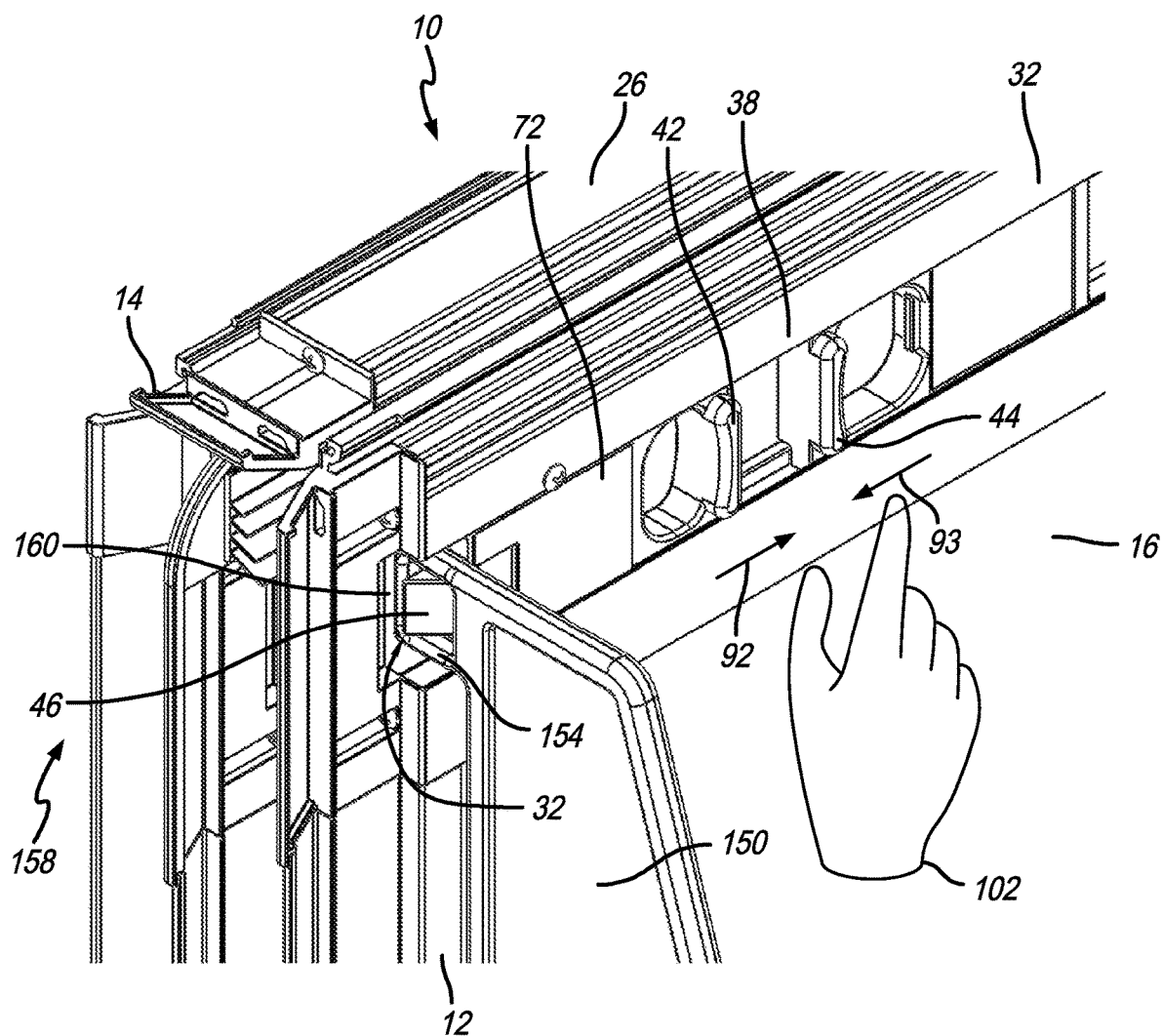
FIG. 21 is a detail view of the connection portion of the gusset and tonneau cover from FIG. 20.

A detail perspective view of a portion of tonneau cover 10 folded over in its upright position with latch 46 engaged in aperture 154 of gusset 150 is shown in FIG. 21. As depicted, operator's hand 102 can activate pinch latch assembly 38 to cause latch 46 to engage aperture 154. It is appreciated from the description of the operation of latching assembly 20 that when gusset assemblies 22 are on both sides of cover 10, actuating one latch to engage the aperture in one gusset may also actuate the opposed latch to engage the opposed gusset. It is further appreciated that only one gusset may be used. In another embodiment, a plurality of gusset assemblies may be used. In addition, because pinch latch assembly 38 is spring loaded, physical actuation of latch handles 42 and 44 may not always be necessary. Pushing the gusset into cavity 160 as part of frame 32, drives the periphery of aperture 154 against spring loaded latch 46. Because of the biasing of the springs and pinch latch assembly 38, once latch 46 has cleared the periphery in aperture 154, it will extend back and latch cover 10 to gusset 150. It is further appreciated that because gusset 150 may slide along the rails attached to the side walls of the bed, gusset 150 may be usable to hold either of panel sections 12, 14, or 16. This view further shows a hinge assembly 26 attached to panel sections 14 and 16 with panel section 12 located there between.

Figure 22:
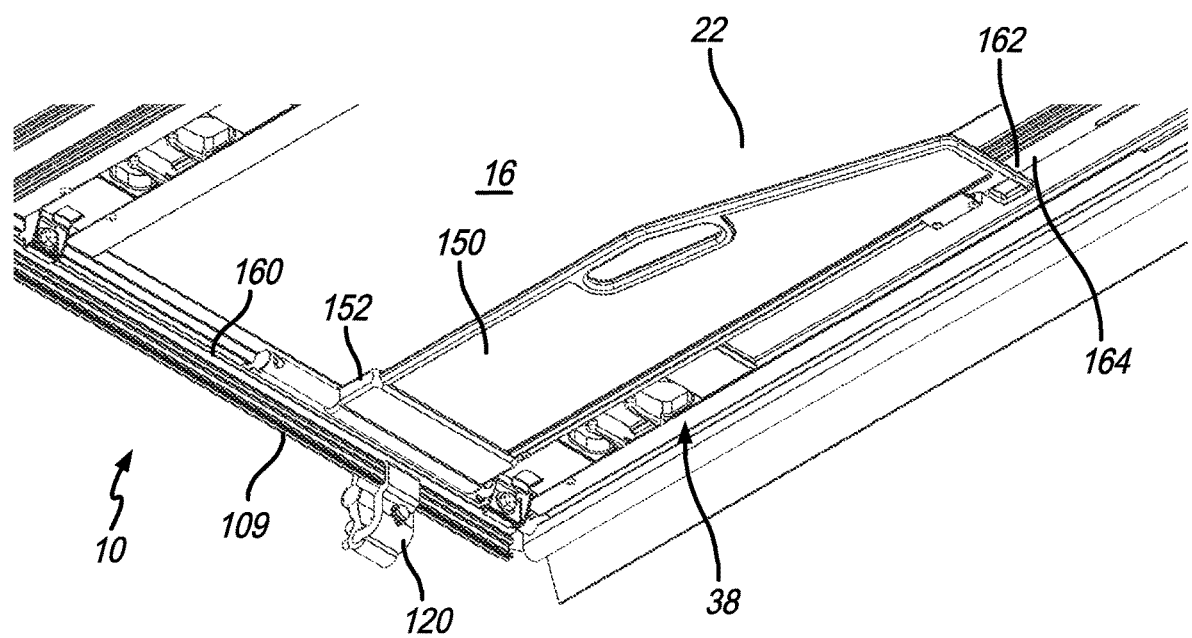
FIG. 22 is an underside view of the tonneau cover showing the gusset located in its stowed position.

An underside perspective view of tonneau cover 10 with gusset assembly 22 located underneath in a stowed position is shown in FIG. 22. As depicted, gusset 150 attaches to its lower end 152, which engages a logistic track 160 in rail 109 and located underneath panel section 16. Gusset assembly 22 may slide along the logistic track 160 to its desired location, and then pivot upward in direction 162 to its use position and then back down in direction 164 to its stowed position.

Figure 23:
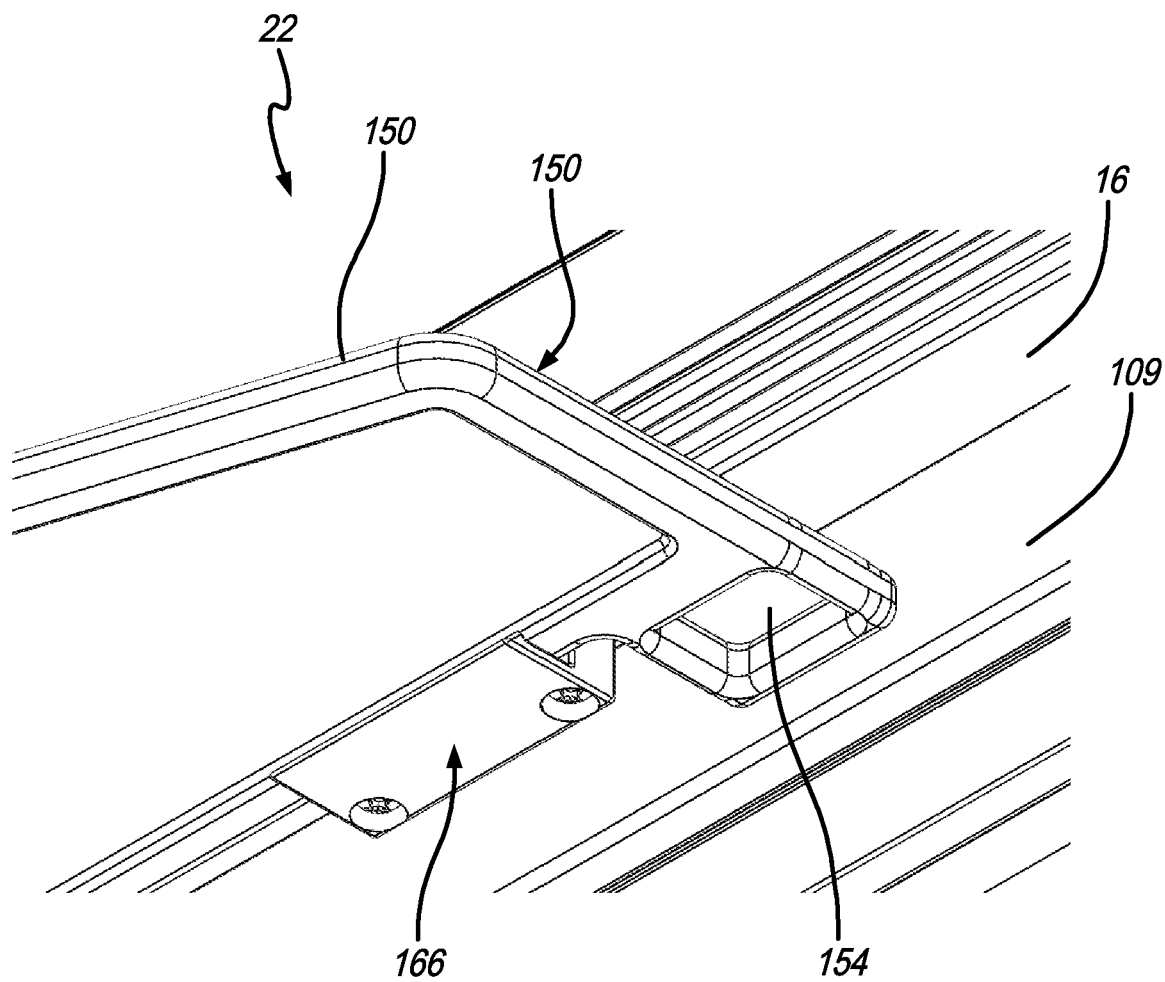
FIG. 23 is a detail perspective view of a portion of the tonneau, again showing the gusset located in its stowed position.

A detail perspective view of a portion of gusset assembly 22 located underneath panel section 16 is shown in FIG. 23. This view shows how a clip 166 may be used to support a portion of gusset 150 while in its lowered, stowed position. This view also shows aperture 154. It is appreciated that clip 166 may be moved to any location along rail 109 so that gusset may be positioned along any desired part thereon.

Figure 24A:
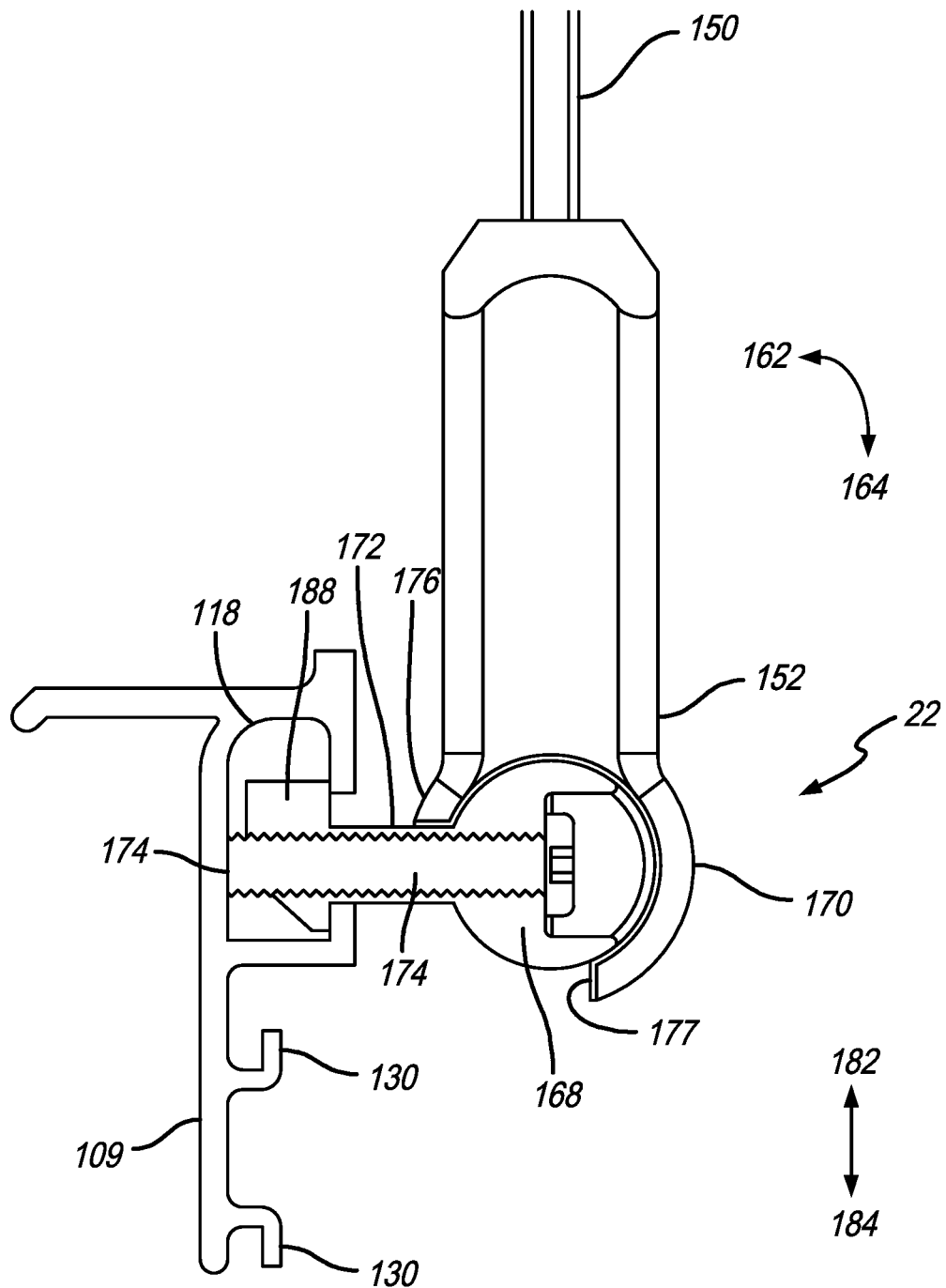
FIGS. 24A and B are end sectional views showing the gusset coupled to the side rail.
Figure 24B:
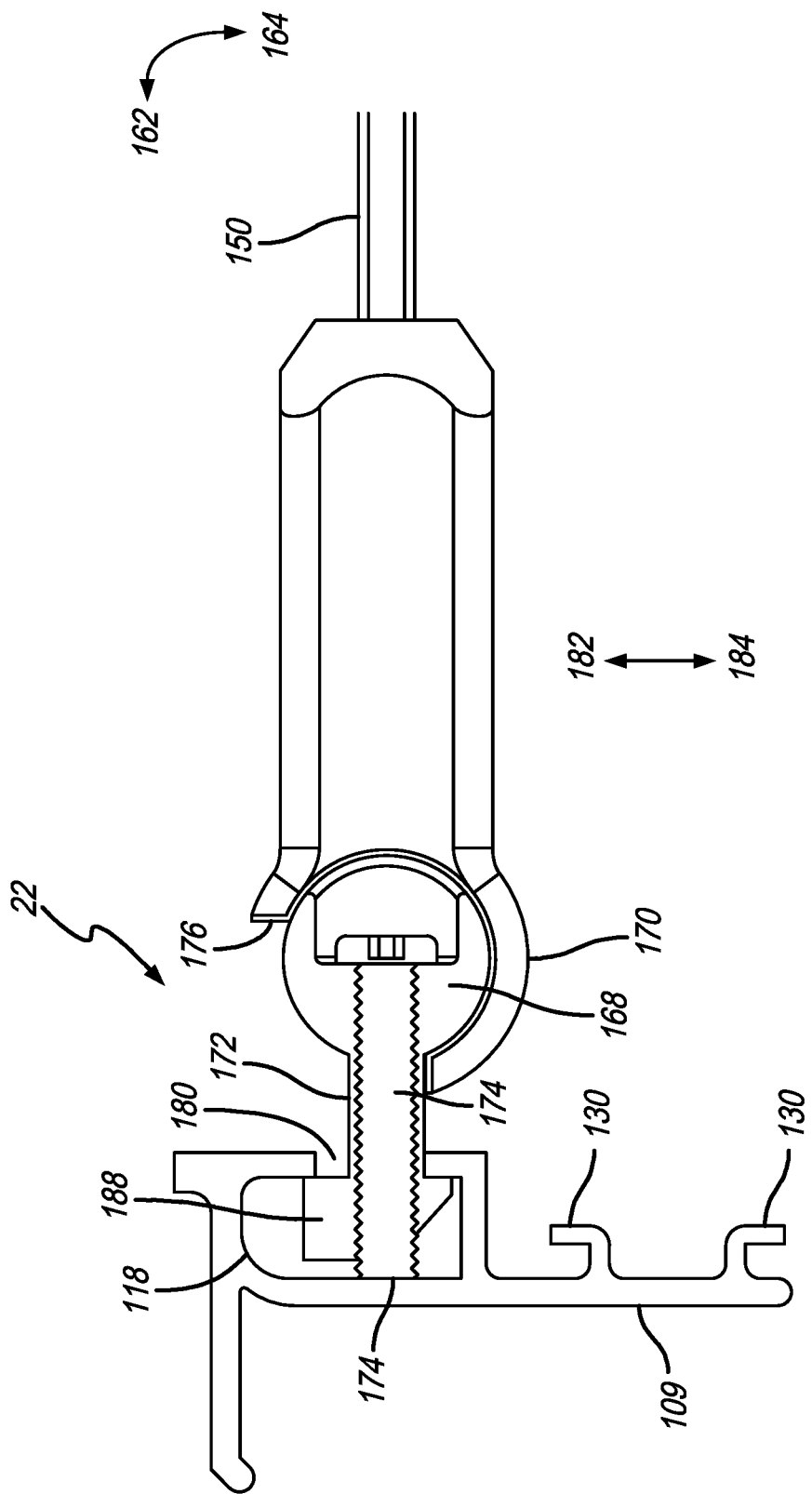

End sectional detail views showing a portion of gusset assembly 22 are shown at FIGS. 24A and B. Lower end 152 of gusset 150 illustratively includes a pivot joint 168 coupled to pivot cap 170. Illustratively extending from pivot joint 168 is arm 172 that extends into logistic track 118 of side rail 109. A fastener 174 selectively secures arm 172 to logistic track 118. In the illustrated view, not only is gusset 150 pivotable in directions 162 and 164, but it is also slidable on pivot joint 168 in directions transverse to 162 and 164. This allows gusset 150 and lower end 152 to be removable. Further, lower end 152 includes stops 176 an 177 that abut arm 172 on pivot joint 168 to limit the degree to which gusset 150 can pivot in directions 162 and 164. Pivot joint 168 and arm 172 are removable from logistic track 118 by loosening fastener 174. In this illustrated embodiment, there is enough clearance in the opening 180 of logistic track 118 to lift ball joint 168 and arm 172 in direction 182. In addition, the end of arm 172 has an arcuate surface 186, which is located opposite an abutment 188. To remove pivot joint 168 after fastener 174 is loosened, arm 172 is raised in direction 182 and then pivoted in direction 162. The logistic track 180 is sized so that arcuate surface 186 will pivot out of opening 180 to permit removal of pivot joint 168.

Figure 25:
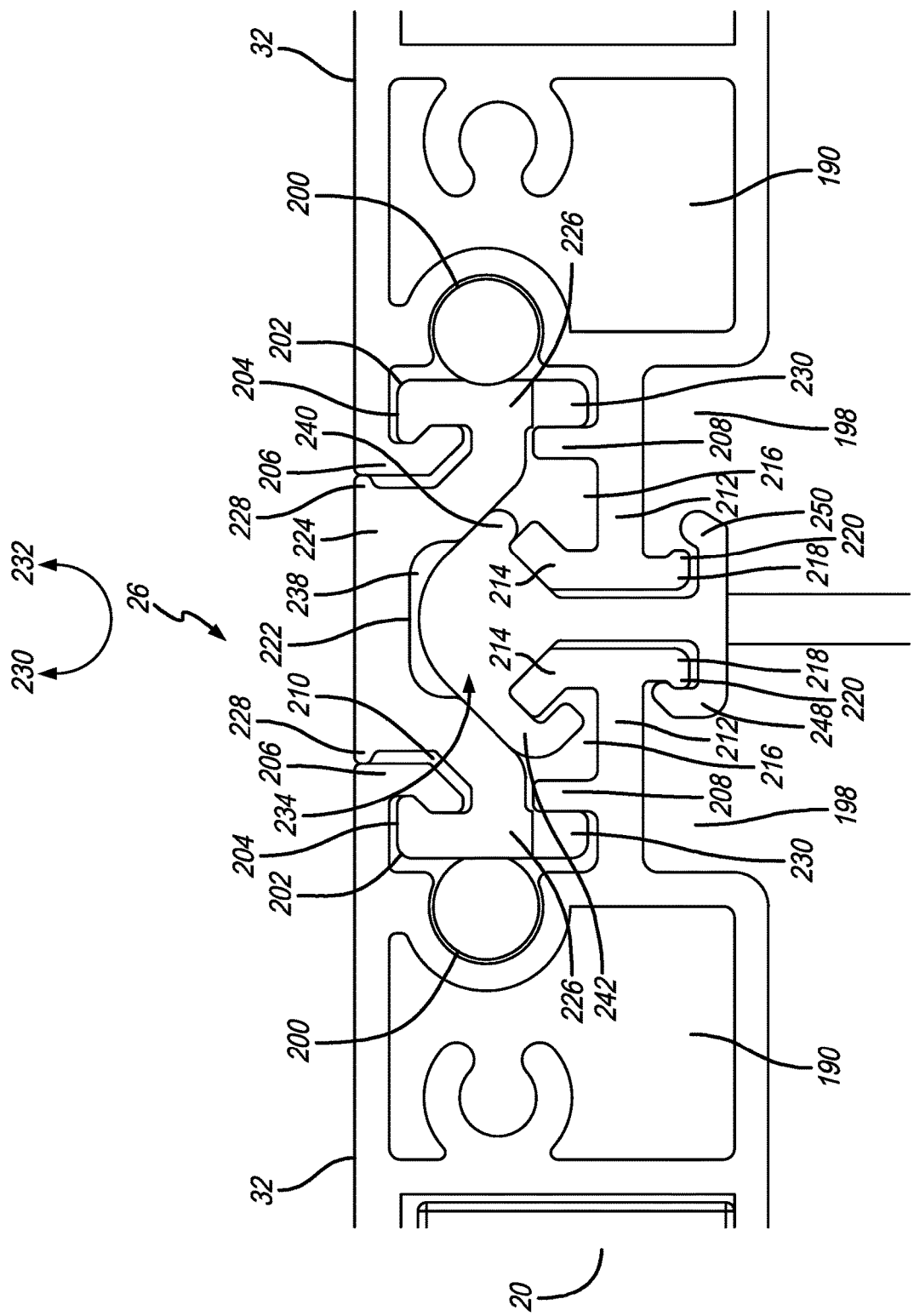
FIG. 25 is a side cross-sectional view of the hinge assembly also showing the hinge seal and a hinge seal spacer.

A side cross-sectional view of a hinge assembly 26 is shown in FIG. 25. The hinge assemblies attach to frames 32 which couple to hinges to illustrative panels 112, 114, and 116 (panels not shown in this view). In addition, and as originally described with respect to FIG. 11, frame 32 proximate to the hinge assembly, at least starting with panel section 14, frame assembly 32, attaches to latching assembly 20. In the illustrated embodiment, hinge assembly 26 includes bracket portions 190 to add structure to latching assembly 20 and frame 32. Adjacent bracket portion 190 is hinge bracket section 198. It is appreciated that each hinge bracket on each side of hinge assembly 26 may be identical and face each other to help create the fully formed hinge. In other embodiments, one hinge bracket may be constructed differently than the opposing hinge bracket. In any event, as the illustrated embodiment shows, hinge bracket 198 includes a hinge rod cavity 200, a slot 202 adjacent to hinge rod cavity 200 and illustratively partially formed thereby. Slot 202 is also defined by finger portion 204 and angled digit 206. An opposed finger portion 208 faces angled digit 206 with an opening 210 located there between. Extending from slot 202 and opposing finger portion as shown is arm 212. At its end, arm 212 includes an angled digit 214 that faces a portion of angled digit 206 with opening 210 located there between and forming another cavity 216 between angled digit 214 and opposed finger portion 208. As shown opposite angled digit 214 is flange member 218 with a tab 220 extending therefrom. In the illustrative embodiment, the opposing hinge bracket 198 includes the same structures, so when facing each other those structures are mirror images of each other.

Located between the opposing hinge brackets 198 is a hinge seal 222 that incorporates a spacer 224. It is appreciated that hinge seal 222 may be made of a resilient material including but not limited to natural or synthetic rubber or silicone. Each side of hinge seal 222 includes a curled finger 226 that is disposed through opening 210, extends into slot 202, and wraps towards angled digit 206. Additionally, in an illustrative embodiment, a tab 228 extends from spacer 224 in order to provide an exterior seal for the hinge. Curled finger 226 also includes an opposed tab 230 that fits into slot 202 adjacent opposing finger portion 208. It is appreciated that hinge spacer 222 may be symmetrical from the cross-sectional end point of view as shown in FIG. 25, such that the same previously-described structures appear on the opposite side. Furthermore, because resilient hinge seal 222 bends in directions 230 and 232, it may serve as the pivot point allowing adjacent panel sections 12 and 14 to fold with respect to each other as well as panel sections 14 and 16. In addition these structures are longitudinally extending the width of the panel section.

Also shown in this view is a hinge seal spacer 234 engageable with angled digits 214 as well as flange member 218 and tab 220 on each of the opposed hinge brackets 198. As depicted in this illustrated embodiment, hinge seal spacer 234 is not necessarily symmetrical despite being fitted into symmetrically arranged structures in hinge assembly 26. As shown, hinge seal spacer 234 includes a head section 236 that fits in cavity 238 of hinge seal 222. On one side of the hinge seal spacer there is a tab portion 240 that provides extra pressure on hinge seal 222 by being disposed in opening 210, angled digit 214 and curled finger 226. Extending opposite of tab portion 240 is a curled digit 242 that bends around the angling digit 214 on arm 212 as shown. A leg 246 extends from head section 236 of hinge seal spacer 234 terminating at a curled foot 248 on one side and an angled foot 250 as shown. Both engage one of the opposing tab portion 220 on flange member 218 from opposing arm 212. It is appreciated that when folding the panel sections relative to each other, angled foot 250 causes a snap between the structures when tab 220 moves past. In addition, the spacer helps maintain separation between opposing bracket 198.

Figure 26:
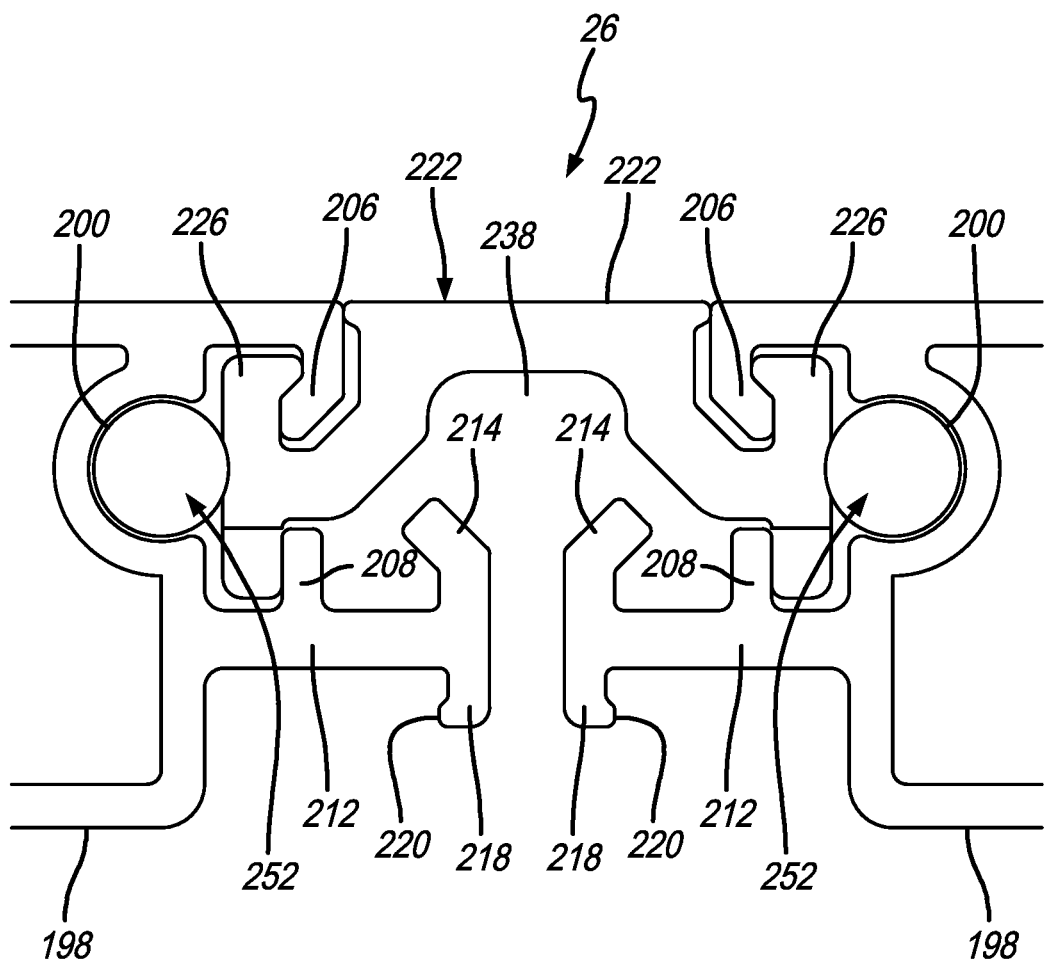
FIG. 26 is a cross-sectional end view of a hinge located between panels.

A detailed and cross-sectional view of hinge assembly 26 is shown in FIG. 26. This view, like the prior view, demonstrates how hinge seal 222 fits between hinge brackets 198. In addition to hinge seal 222, hinge seal rods 252 are each located in respective hinge rod cavities 200. These hinge seal rods 252 each abut curled finger 226 of hinge seal 222 as shown. This abutment provides extra seal properties for hinge seal 222 on each of its sides as shown. Further, engagement between angled digit 206 and curled finger 226 of hinge seal 222 provides extra friction there between to prevent slipping and misalignment.

Figure 27:
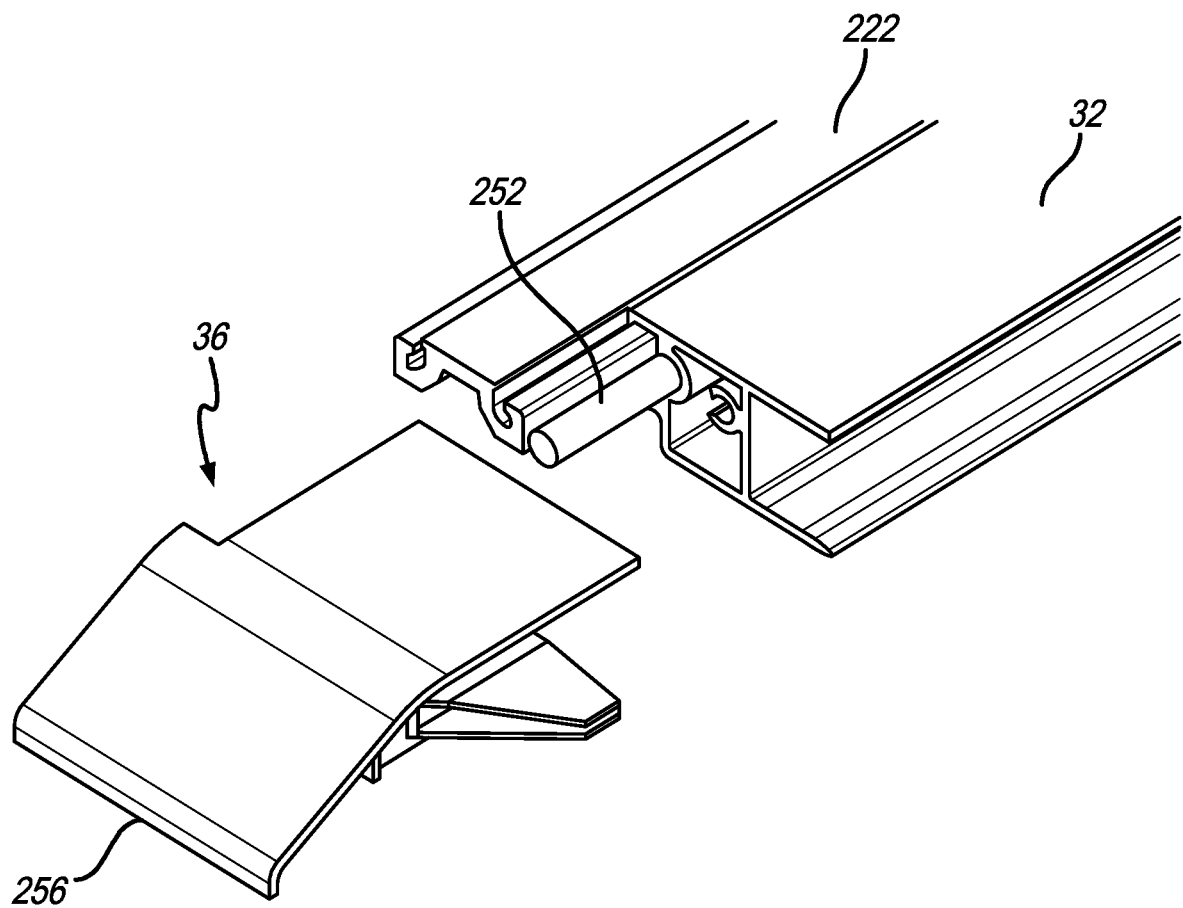
FIG. 27 is a perspective, partially exploded view of a portion of the panel with the hinge and end cap.

The perspective detail view of frame 32 along with hinge seal 222 and hinge seal rod 252, along with end cap 256 is shown in FIG. 27. End cap 256 may be part of flange edge 36 previously discussed in other views. It is appreciated that hinge seal rod 252 may assist rigidly aligns end cap 256.

Tonneau cover 10 attaches to the side walls of the truck bed via the side bed rails such as bed rail 109 as previously discussed. Side rail 109 (as well as side rail 110 previously discussed) includes both logistic track 118 to receive clips 106 and 108 as well as an attachment track or rail flange 130 to receive rail brackets 120 and 122 (see FIG. 13). Side bed rail 109 may have a seal 119 that conforms to the bed wall to assist in better sealment between the cover and the bed wall. Seal 260 on top of rail 109 may be "D"-shaped that conforms to the rail and abuts against a ridge 123 on cover 10. This reduces the possibility of water entering the bed with the cover closed. Instead, the water drains outside of the cover.

Figure 28:
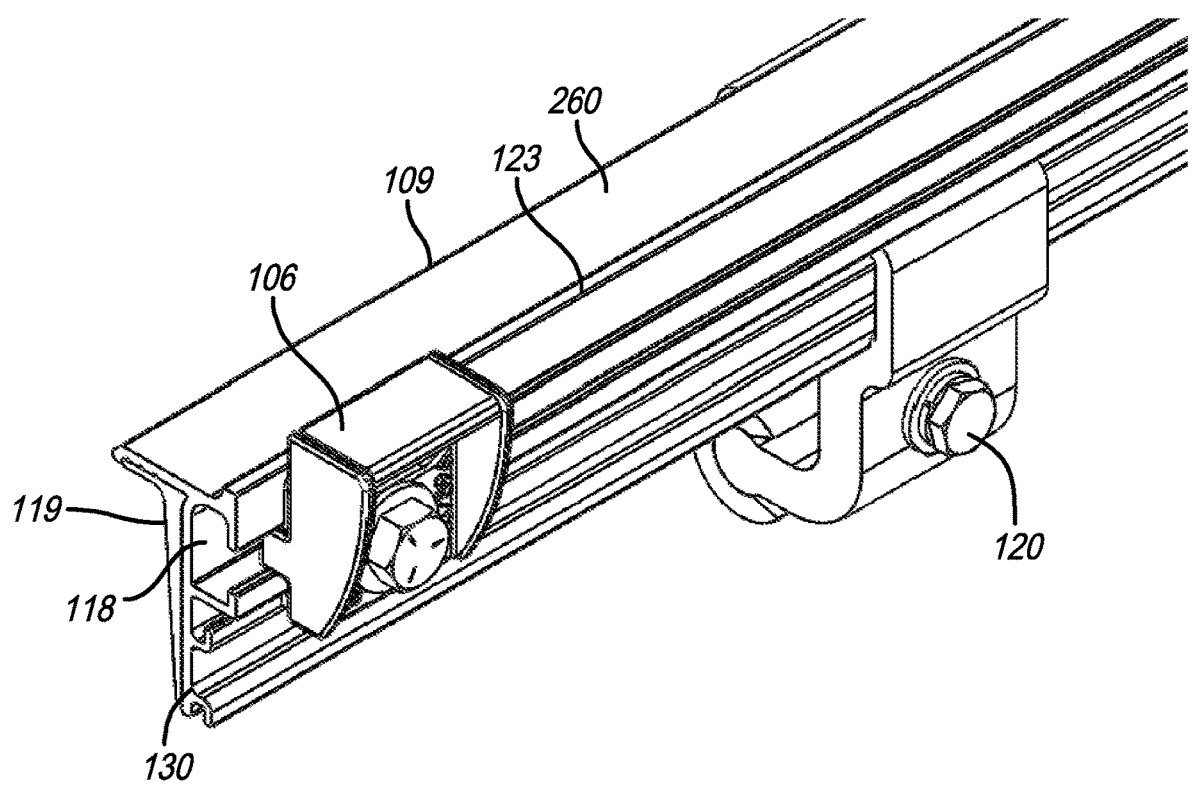
FIG. 28 is a perspective view of a portion of the side bed rail with a clamp assembly attached thereto.

An isolated detail perspective view of a portion of side bed rail 109 is shown in FIG. 28. As shown, clip 106 (or 108) fits into logistic track 118 as previously discussed. Rail clamp 120 (or 122) attaches side bed rail 109 to the bed wall 6 by gripping rail flange 130. It is appreciated that both clip 106 (or 108) and clamp 120 (or 122) may slide along rail 109 (or 110) until reaching the desired location.

Figure 29:
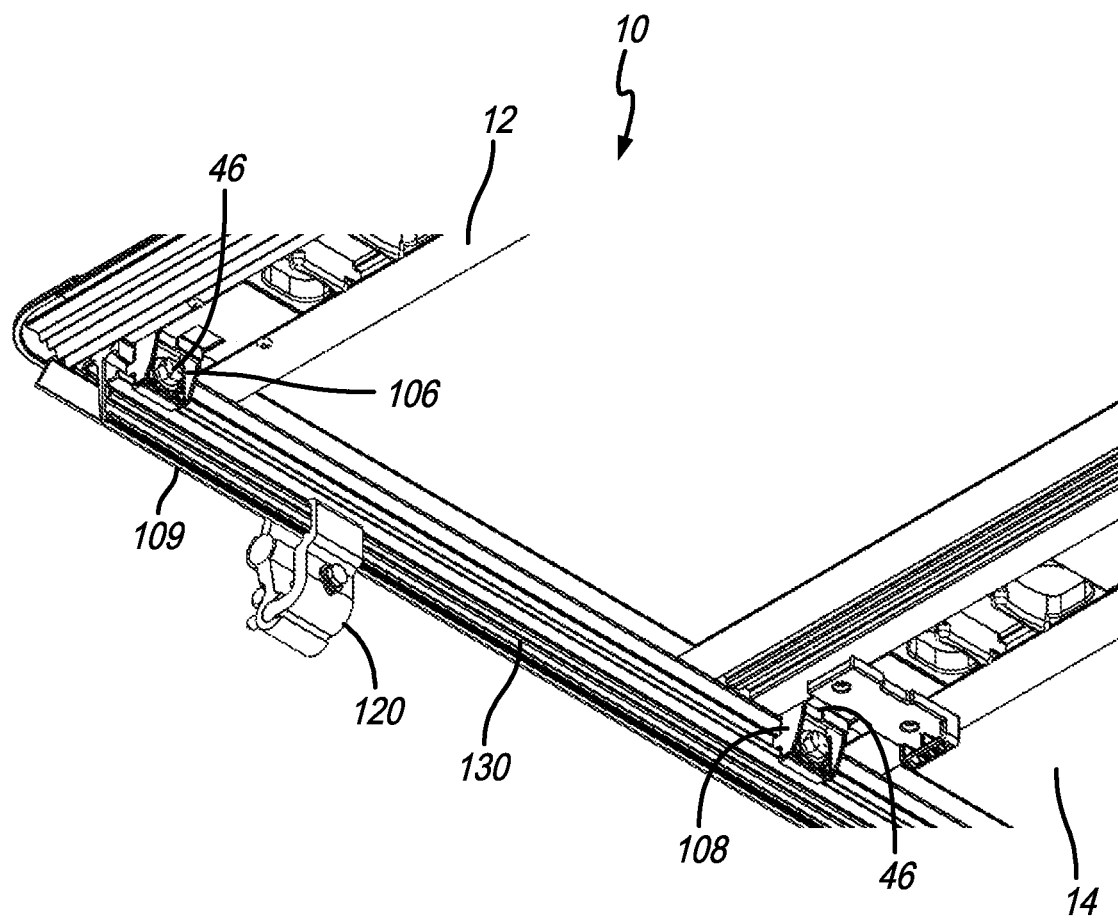
FIG. 29 is a perspective view of a portion of the tonneau cover panels attached to the side bed rail.

An underside view of a portion of cover 10 attached to rail 109 is shown in FIG. 29. This view demonstrates how latch 46 secures panel section 12 to the truck bed. Furthermore, it is appreciated from this view how additional clips such as clips 106 and 108 are likewise attached to rail 109 to receive latch 46 from panel section 14. The view also depicts how cover 10 sets on top of rail 109.

Figure 30:
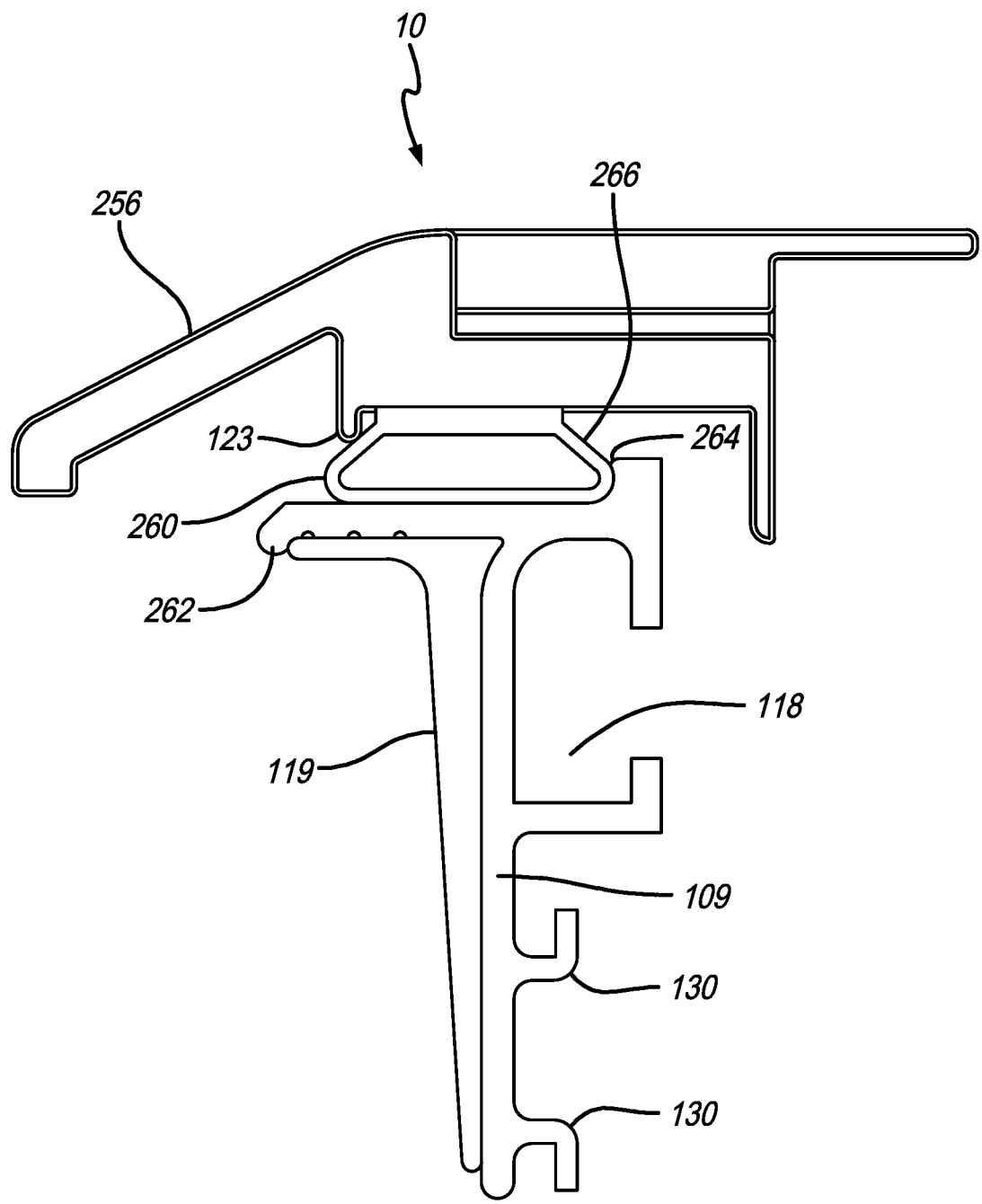
FIG. 30 is a cross-sectional view showing the side bed rail for attaching to a truck bed side wall with a portion of a panel and D-seal.

A cross-sectional end view of side bed rail 109 supporting a panel section is shown in FIG. 30. This view demonstrates how D-seal 260 sets on shelf 262 supported by the rails. Shelf 262 includes an upturned portion 264 that assists in reducing the ability of water to get into bed 4. End cap 256 includes a recess 266 that receives D-seal 260. An end tab 123 on end cap 256 also assists keeping water out. This view further shows the shape of logistic track 118 and attachment track 130.

Cover 10 includes a securement system 28 to hold the folded panels in an upright position when the cover is open. The securement system includes a bracket illustratively affixed to the base panel where a channel in the bracket receives the folded panel sections and holds them upright. A buckle or similar latching system may then secure the panel sections in that upright position, keeping the cover open. Using the channel bracket also keeps the panel sections off of the surface of the base panel so the panel sections do not scratch it. In the illustrated embodiment, the attachment points for the buckles are in proximity to the latching assemblies. By securing the panels upright, they will not pivot back and forth, either falling towards and hitting the truck cab, or falling backwards back on top of the bed.

Figure 31:
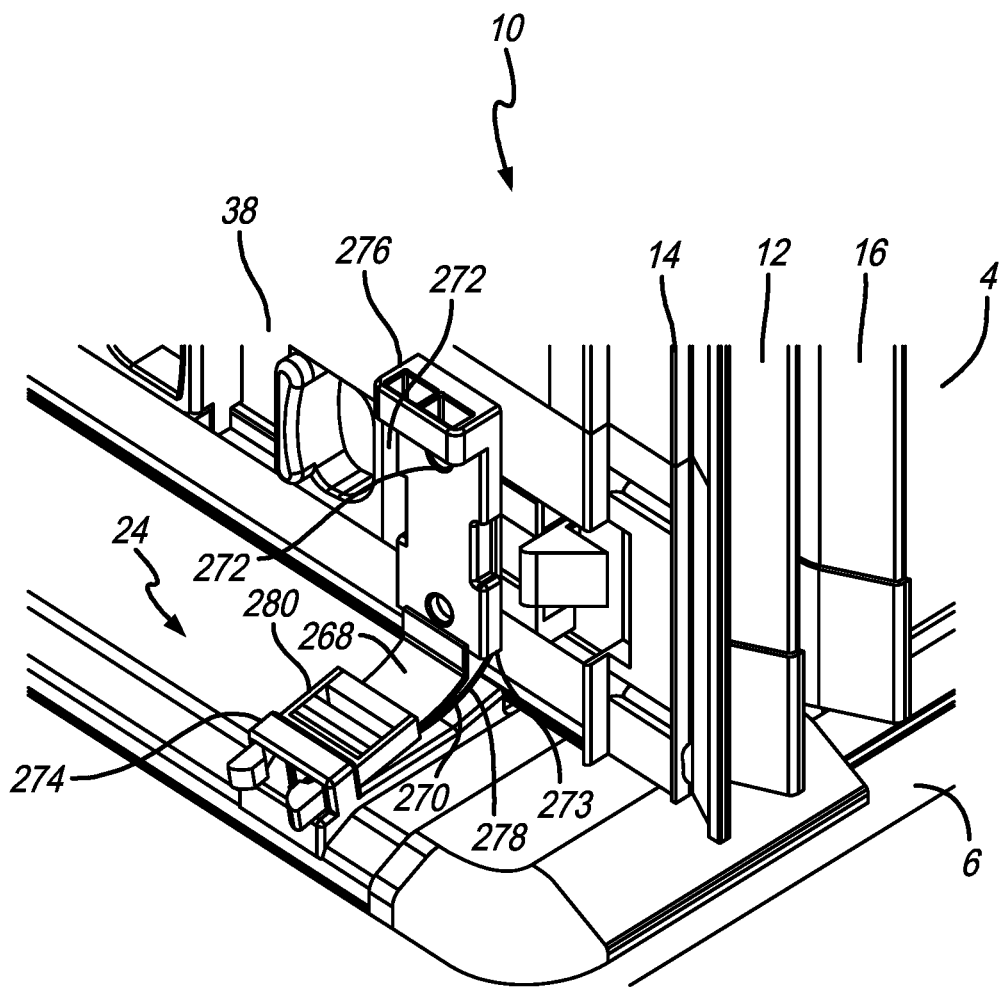
FIG. 31 is a perspective detail view of a portion of the tonneau cover located in its raised stowed position.

A detail perspective view of a portion of cover 10 attached to bed 4 with side wall 6 is shown in FIG. 31. Here panel sections 12, 14, and 16 are folded and raised upright vertically. They are also fitted in channel 270 of channel bracket 268. A securement bracket 272, part of securement system 24, is attached to the underside of panel section 14 in proximity of latch 46 and pinch latch assembly 38. In the illustrated embodiment, it fastens to panel section 14 using the same fasteners that secure latch guide 72 (see FIG. 7) to panel section 14. Another view of securement bracket 272 is shown in FIG. 11. One end of buckle strap 278 is affixed to securement bracket 272 at 273. In an illustrative embodiment the same fastener that attaches bracket 272 to panel section 214 may also attach strap 278 to bracket 272. Buckle 280 attached to strap 272 inserts into buckle receptacle 274 opposite 273. When buckle 280 is not needed it can be snapped into buckle receptacle 276 for storage (see, also, FIG. 33).

Figure 32:
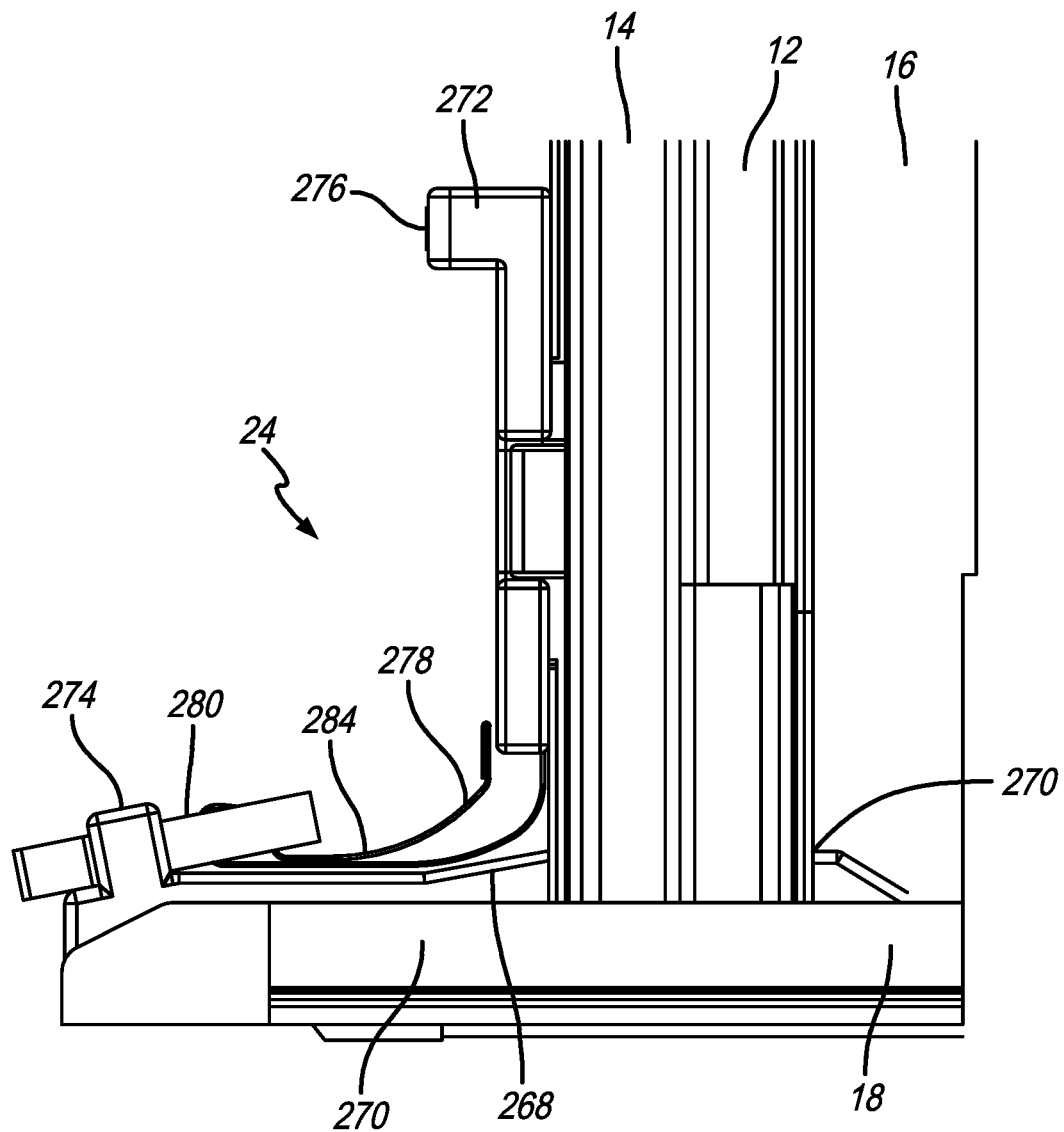
FIG. 32 is a detail end view of the tonneau cover shown in FIG. 31.

A side view of the portion of cover 10 is shown in FIG. 32. This view shows panel sections 12, 14, and 16 positioned substantially vertically with sections 12 and 14 fitted in channel 270 of channel bracket 268 and secured into place via buckle strap 278 attached to receptacle 274 of buckle 280. This view also depicts how channel bracket 268 keeps panel sections 12, 14, and 16 off of base panel section 18 so as to not mar the same. In addition to securing the panels in the fore and aft directions, the buckle assembly also helps secure the panel sections in the vertical direction so they do not bounce out of channel 270.

Figure 33:
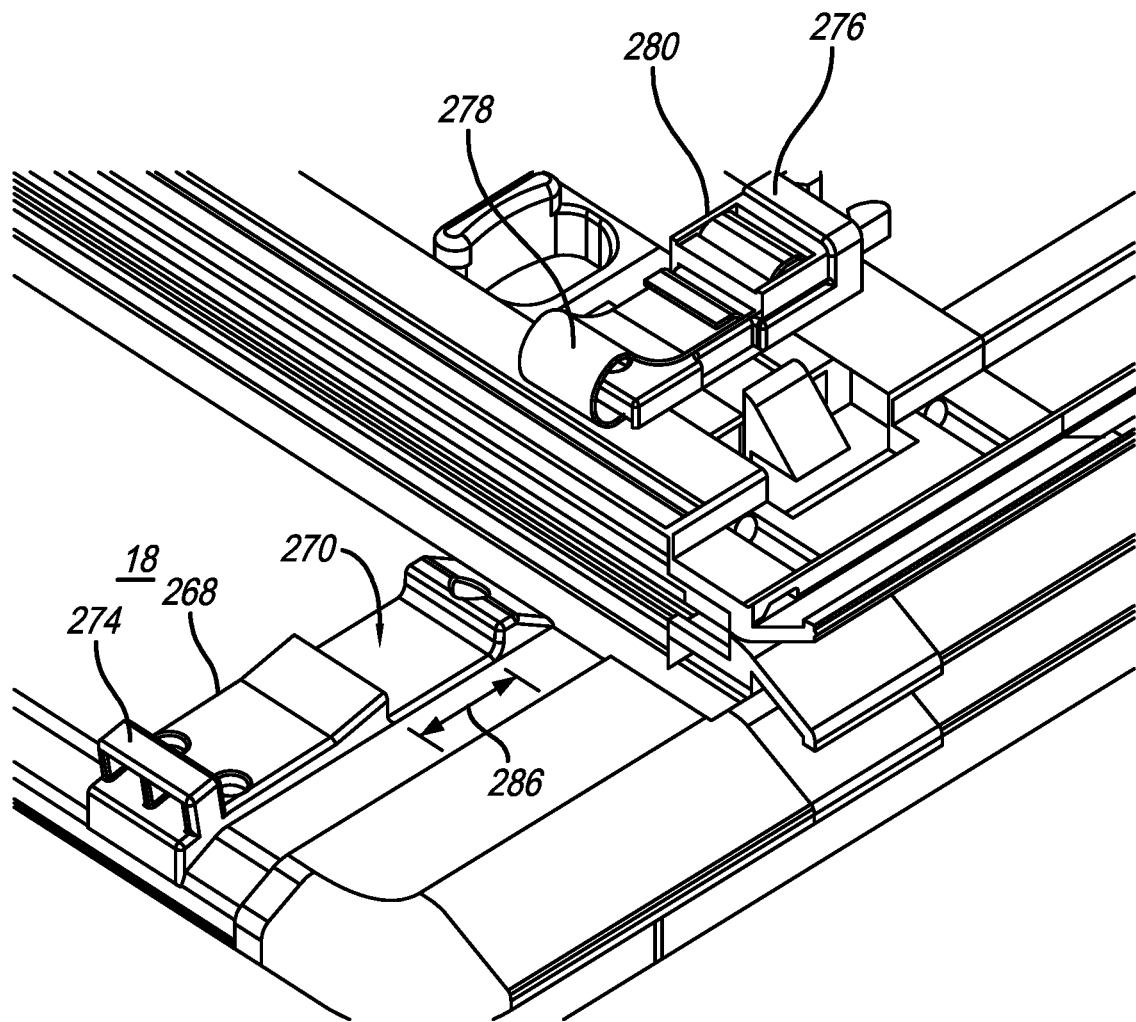
FIG. 33 is a perspective detail view of the buckle pocket.

The perspective view of base panel section 18 is shown in FIG. 33. This view depicts how channel bracket 268 is attached thereto. It is clear from these views how the width 286 of channel 270 is sized sufficient to hold panel sections 12 and 14. It is appreciated that channel 270 may be sized to hold more or less panel sections as desired.

Figure 34:
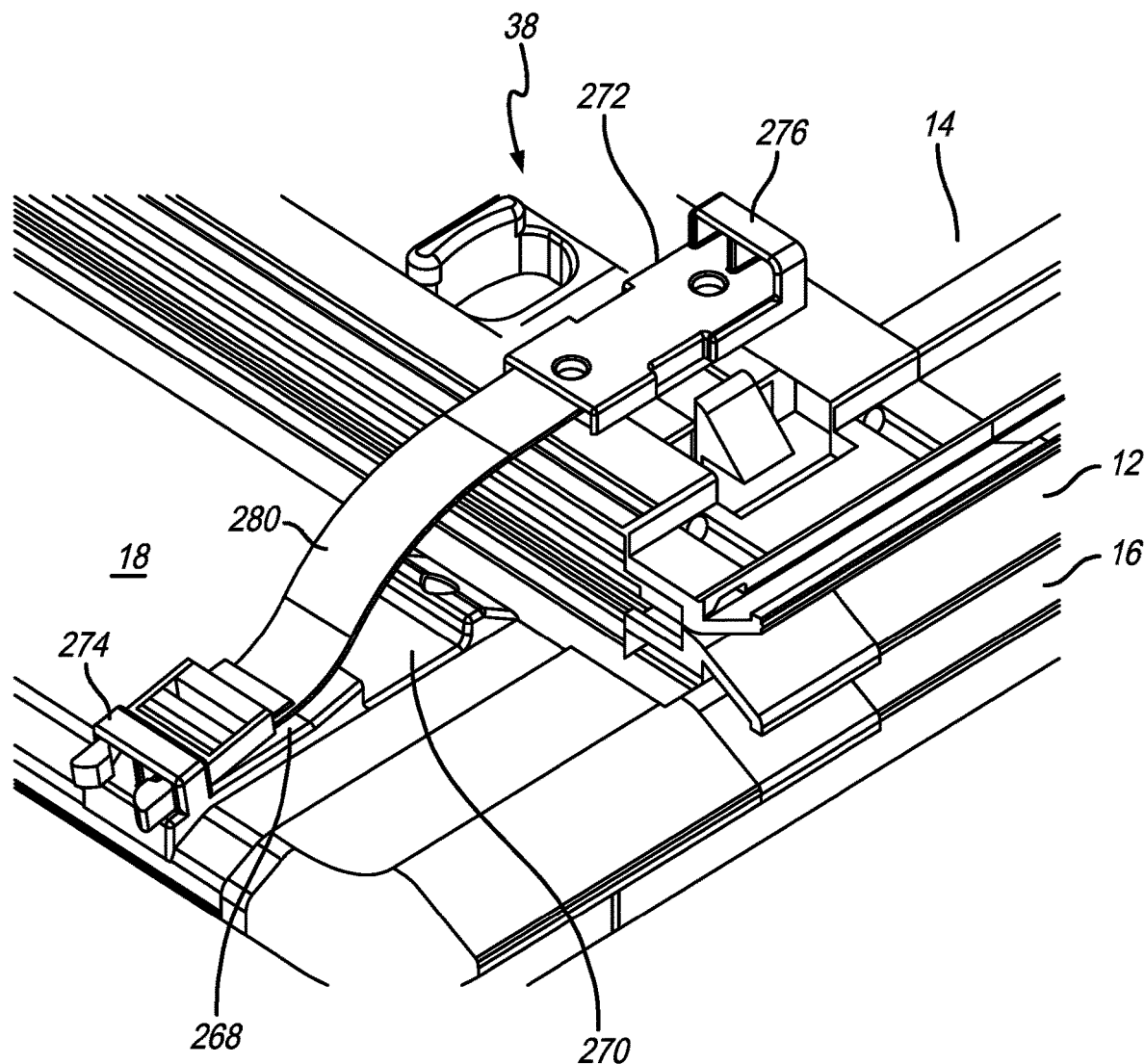
FIG. 34 is a perspective view of the buckle assembly.

As shown in FIG. 34, when the panels 12, 14, and 16 are in a folded but horizontal position, affixing buckle 280 into receptacle 274, helps secure the panels. In this configuration the panels will not unfold sue to wind while the truck is moving.

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Although certain embodiments have been described and illustrated in exemplary forms with a certain degree of particularity, it is noted that the description and illustrations have been made by way of example only. Numerous changes in the details of construction, combination, and arrangement of parts and operations may be made. Accordingly, such changes are intended to be included within the scope of the disclosure, the protected scope of which is defined by the claims.

What is claimed is:

1. A tonneau cover for use over a truck bed of a pickup truck, the tonneau cover comprising:
   at least one panel section;
   a first latching assembly coupled to the at least one panel section;
   wherein the first latching assembly includes a first pinch latch assembly and a second pinch latch assembly;
   wherein the first pinch latch assembly includes a latch handle portion and an inner pinch handle portion;
   wherein when a force is applied to the first pinch latch assembly it moves to an unlatched condition; and
   a light assembly located in the inner pinch handle portion of the first pinch latch assembly.

2. The tonneau cover of claim 1, further comprising a second panel section pivotally attached to the at least one panel section, a second latching assembly coupled to the second panel section, and a second light assembly located on the second latching assembly.

3. The tonneau cover of claim 1, further comprising a cavity disposed in the inner pinch handle portion of the first pinch latch assembly wherein the light assembly is received in the cavity.

4. The tonneau cover of claim 2, further comprising a second cavity disposed in an inner pinch handle portion of the second latching assembly and the second light assembly is received in the second cavity.

5. The tonneau cover of claim 1, wherein the first latching assembly includes a cavity disposed therein, wherein the cavity receives the light assembly.

6. The tonneau cover of claim 2, wherein the second latching assembly includes a second cavity disposed therein, wherein the second cavity receives the second light assembly.

7. A tonneau cover for use over a truck bed of a pickup truck, the tonneau cover comprising:
   a cover configured to shroud at least a portion of the truck bed;
   a first latching assembly coupled to the cover;
   a second latching assembly located opposite the first latching assembly;
   wherein the first latching assembly includes first and second pinch handles;
   wherein the first pinch handle of the first latching assembly actuates the second latching assembly and the second pinch handle of the first latching assembly actuates the first latching assembly; and
   a light assembly accompanying the first latching assembly;
   wherein the light assembly is coupled to the first latching assembly adjacent the first pinch handle.

8. The tonneau cover of claim 7, wherein the light assembly is located on an underside of the cover with the first latching assembly.

9. The tonneau cover of claim 7, wherein the cover is composed of at least a first panel section and a second panel section.

10. The tonneau cover of claim 7, wherein the second latching assembly includes a second light assembly coupled to the second latching assembly.

11. The tonneau cover of claim 7, wherein the light assembly is battery operated.

12. The tonneau cover of claim 7, further comprising a cavity disposed in the first latching assembly wherein the light assembly is received in the cavity.

13. A tonneau cover for use over a truck bed of a pickup truck, the tonneau cover comprising:
   at least one panel section;
   a first latching assembly coupled to the at least one panel section;
   a second latching assembly located opposite the first latching assembly on an opposing side of the at least one panel;
   wherein the first latching assembly includes at least one handle extending from an underside of the at least one panel section;
   wherein the at least one handle is engageable on the underside of the at least one panel section to be slid laterally with respect to the second latching assembly to unlatch the at least one panel section; and
   a light assembly located on the first latching assembly adjacent the at least one handle.

14. The tonneau cover of claim 13, wherein the first latching assembly includes a cavity disposed therein, wherein the cavity receives the light assembly.

* * * * *